United States Patent [19]

Bakholdin et al.

[11] Patent Number: 5,628,232
[45] Date of Patent: May 13, 1997

[54] FLYWHEEL ROTOR WITH CONICAL HUB AND METHODS OF MANUFACTURE THEREFOR

[76] Inventors: Daniel Bakholdin, 14929 Sylvan St., Van Nuys, Calif. 91411; Robert W. Bosley, 18104 Hoffman Ave., Cerritos, Calif. 90701; Harold A. Rosen, 14629 Hilltree Rd., Santa Monica, Calif. 90402; William Grayer, 15720 Ventura Blvd. #411, Encino, Calif. 91436

[21] Appl. No.: 242,647

[22] Filed: May 13, 1994

Related U.S. Application Data

[63] Continuation-in-part of Ser. No. 181,038, Jan. 14, 1994.
[51] Int. Cl.⁶ ..................................... G05G 1/00
[52] U.S. Cl. ........................ 74/572; 74/573 R; 74/574
[58] Field of Search ........................... 74/572, 573 R, 74/574, 573 F; 310/74, 90.5; 318/161; 322/4

[56] References Cited

U.S. PATENT DOCUMENTS

| | | | |
|---|---|---|---|
| 3,683,216 | 8/1972 | Post | 74/572 X |
| 3,741,034 | 6/1973 | Post | 74/572 |
| 3,859,868 | 1/1975 | Post | 74/572 |
| 3,955,858 | 5/1976 | Poubeau | 308/10 |
| 4,075,542 | 2/1978 | Szegedy | 318/161 |
| 4,241,654 | 12/1980 | Van Der Lely | 74/572 X |
| 4,266,442 | 5/1981 | Zorzi | 74/572 |
| 4,283,959 | 8/1981 | Strittmatter et al. | 74/572 X |
| 4,285,251 | 8/1981 | Swartout | 74/572 |
| 4,341,001 | 7/1982 | Swartout | 74/572 X |
| 4,444,444 | 4/1984 | Benedetti et al. | 308/10 |
| 4,603,555 | 8/1986 | Mayer | 74/609 |
| 4,723,735 | 2/1988 | Eisenhaure et al. | 310/90.5 |
| 4,821,599 | 4/1989 | Medlicott | 74/572 |
| 5,214,981 | 6/1993 | Weinberger et al. | 74/573 R |

Primary Examiner—Vinh T. Luong
Attorney, Agent, or Firm—Raymond H. J. Powell, Jr.

[57] ABSTRACT

A flywheel rotor used in a flywheel energy storage system providing a high energy storage capacity while providing an ample volume for a high power motor-generator within its envelope includes an outer, primarily cylindrical body having conically tapered end sections, a conical hub section attached to the outer body, and a relatively short inner cylinder, which cylinder connects shaft to the inner portion of the conical hub section. In an exemplary case, the individual components are predominantly constructed of filament wound fiber composites while allowing material choices to be driven by both cost and performance. According to one aspect of the rotor, the inner portion of the inner cylinder can be a slotted aluminum cylinder.

10 Claims, 23 Drawing Sheets

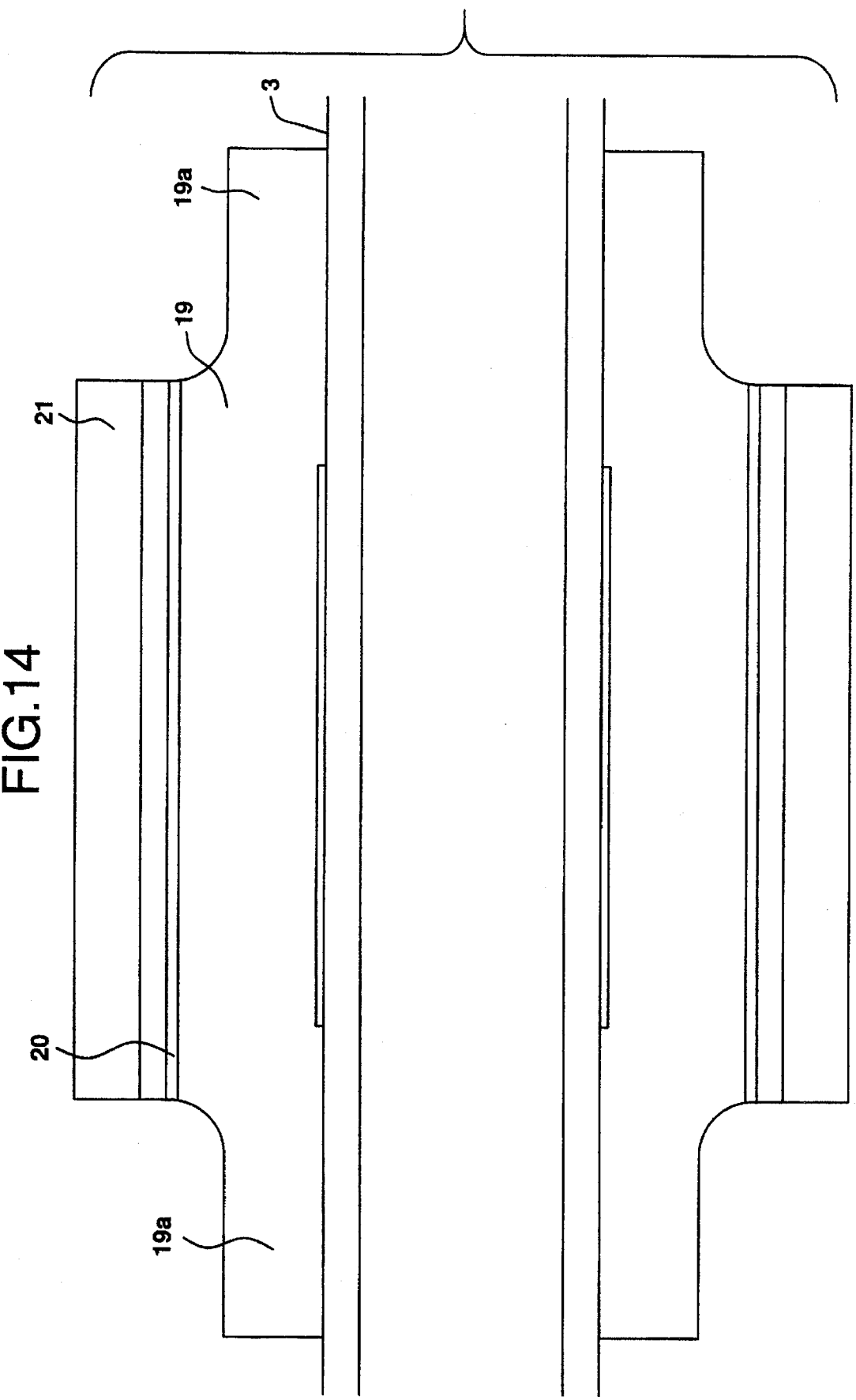

FLYWHEEL ROTOR WITH CONICAL HUB AND METHODS OF MANUFACTURE THEREFOR

This is a continuation-in-part of pending application Ser. No. 08/181,038 filed Jan. 14, 1994.

BACKGROUND OF THE INVENTION

1. Field of the Invention

The present invention relates to a rotor employed in a flywheel energy storage device. More specifically, the present invention relates to a rotor wherein the power density and the energy density of the system are optimized while the manufacturing cost is minimized. Methods for manufacturing a rotor according to the present invention are also disclosed.

2. Description of the Prior Art

Flywheel systems currently being designed for mobile energy storage are generally intended to replace batteries in electrically powered vehicles. One specific example of such a system was disclosed in commonly assigned, co-pending application Ser. No. 08/148,361, which is incorporated herein by reference for all purposes. In such applications, multiple units are needed to store the required energy, so that each motor-generator need supply only a small portion of the vehicle's power. In systems where all of the surge power must be supplied by a single flywheel, the relatively large size of the single motor-generator makes it difficult to provide the needed energy density without reducing safety factors, e.g., for radial stresses, to unacceptable low levels or raising manufacturing costs to exorbitantly high levels.

U.S. Pat. No. 3,741,034 discloses rotor designs using high strength-to-weight ratio filament wound composites in relatively thin concentric cylinders, which cylinders are separated by radial springs. While this arrangement limits the radial stresses to tolerable values, it is expensive to manufacture.

U.S. Pat. No. 3,859,868 discloses techniques for varying the elasticity-density ratio of the rotor elements to minimize radial stresses. On the other hand, U.S. Pat. Nos. 4,341,001 and 4,821,599 describe the use of curved metallic hubs to connect the energy storage elements to the axle. Additionally, U.S. Pat. No. 5,124,605 discloses a flywheel system employing counter-rotating flywheels, each of which includes a hub, a rim and a plurality of tubular assemblies disposed parallel to the hub axis for connecting the hub to the rim while allowing for differential radial expansion between the hub and the rim.

None of these references deal with the integration of a large, high power motor-generator into the flywheel energy storage system currently being designed for vehicles.

SUMMARY OF THE INVENTION

The principle purpose of the present invention is to provide a high energy density rotor.

Another object according the present invention is to provide a high energy density rotor which includes ample space within its volume for a large, relatively high power motor-generator.

Still another object according the present invention is to provide a high energy density rotor which can be easily manufactured.

Yet another object according the present invention is to provide a high energy density rotor which can be manufactured at a reasonable cost.

These and other objects, features and advantages according to the present invention are provided by a rotor including a generally cylindrical outer portion for storing most of the energy, and a hub portion attaching the outer portion to the shaft. In an exemplary case, the hub portion includes a thin-walled conical member which can be attached to the outer cylindrical portion at the outer extremity of the hub portion, and an inner cylindrical member of relatively short axial extent upon which the conical member is wound.

According to one aspect of the invention, the arrangement of rotor components provides the desired geometric properties in a readily manufacturable configuration.

These and other objects, features and advantages according to the present invention are provided by a method for manufacturing a hub, including an inner cylindrical member and a conical connecting member, and an outer cylindrical portion, arranged in that order. The method includes the steps of providing a shaft-mounted cylinder, winding a first material about the cylinder so as to extend a radius of the cylinder by a predetermined amount, winding a first fiber having a predetermined tensile strength in a first direction so as to form a conical member extending at a predetermined first angle and winding a second fiber having a predetermined second tensile strength, the second tensile strength being much greater than the first tensile strength, in a second direction so as to form a cylinder portion.

According to one aspect of the invention, adequate performance in the flywheel rotor is provided by a shaft-mounted aluminum cylinder including a plurality of radial slots. It should be noted that the above arrangement is most suited to applications wherein the flywheel rotor operates at low to moderate speeds. When speeds in excess of 1000 meters per second are contemplated, a two piece or three piece composite cylinder advantageously can be used in place of the aluminum cylinder. Alteratively, a folded cone including an inner cone and an outer cone can also be used to connect the shaft to the outermost cylinder.

These and other features and advantages of the present invention will become more apparent from the following detailed description, taken in conjunction with the accompanying drawings.

BRIEF DESCRIPTION OF THE DRAWINGS

The preferred embodiments are described with reference to the drawings, in which like elements are denoted by like numbers, and in which:

FIG. 3 is a limited view of an outer cylindrical portion of the flywheel illustrated in FIG. 2 wherein FIG. 3A illustrates structural members included in the cylindrical portion while

FIG. 6A is a top sectional view of the hub portion shown in FIG. 2, while

FIG. 7A is an expanded view illustrating the inner section between cylindrical portion and the hub portion of the rotor shown in FIG. 2, while

FIG. 14 is a sectional view illustrating an interference fit between an aluminum cylinder with the rotor shaft;

DESCRIPTION OF THE PREFERRED EMBODIMENTS

Figure 1:
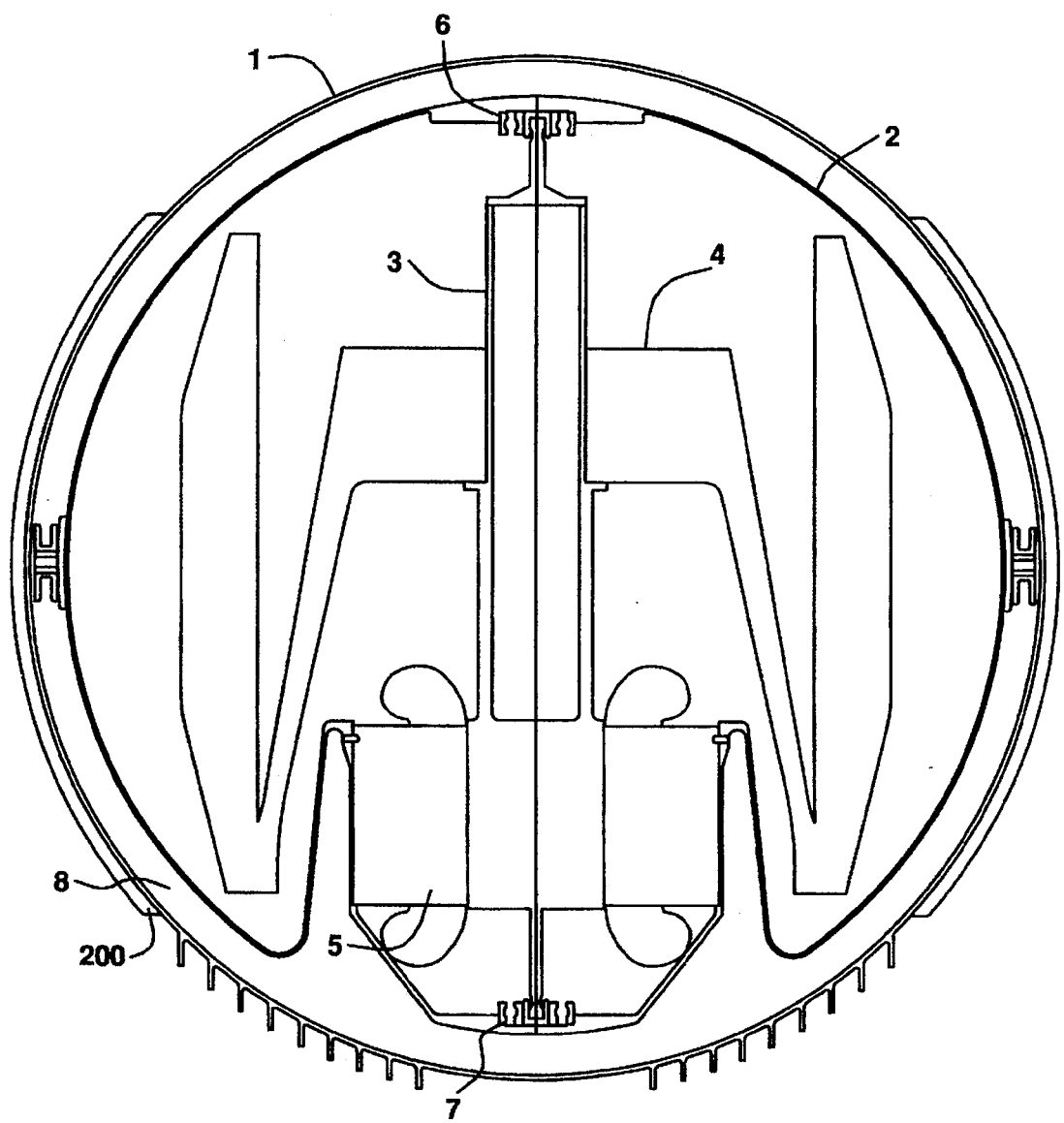
FIG. 1 is an illustration view of the flywheel energy storage system according to the present invention.

The general arrangement of the flywheel energy storage system according to the present invention is shown in FIG. 1, which includes an outer housing 1 and vacuum housing 2 separated from one another by a fluid 8 in which the vacuum housing 2 floats. A rotor 4 is connected to the rotating shaft 3, which is supported by magnetic bearings 6 and 7. A motor-generator 5 advantageously converts mechanical energy into electrical energy and vice versa. A mechanical barrier, e.g., a KEVLAR (aramid fiber) wrap 200, provides a safety barrier for the flywheel energy storage system.

Preferably, rotor 4, which in an exemplary case is 12 inches in diameter, stores 2 kilowatt-hours, i.e., 7,200,000 joules, of energy at a maximum rotational speed of 8000 radians per second. It will be appreciated that this corresponds to a surface speed of over 1,200 meters per second. It will be noted that this high speed requires that the rotating assembly be enclosed in an evacuated container. Moreover, the high centrifugal accelerations require that the rotor 4 be constructed primarily of high strength fiber composites, e.g., a filament wound in the circumferential direction.

Figure 2:
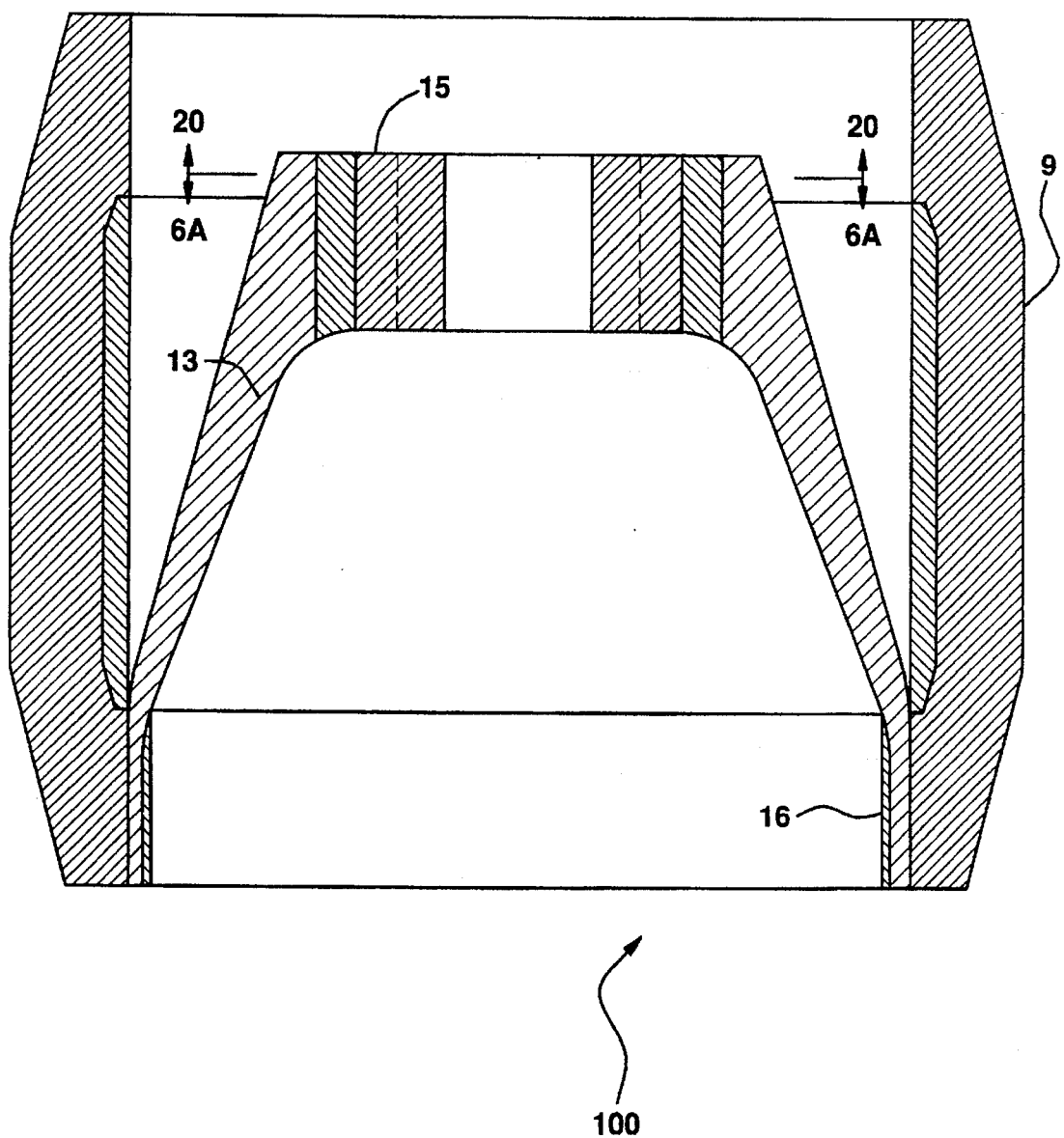
FIG. 2 is an expanded view which is useful in explaining the construction of a flywheel rotor according to the present invention.
Figure 3A:
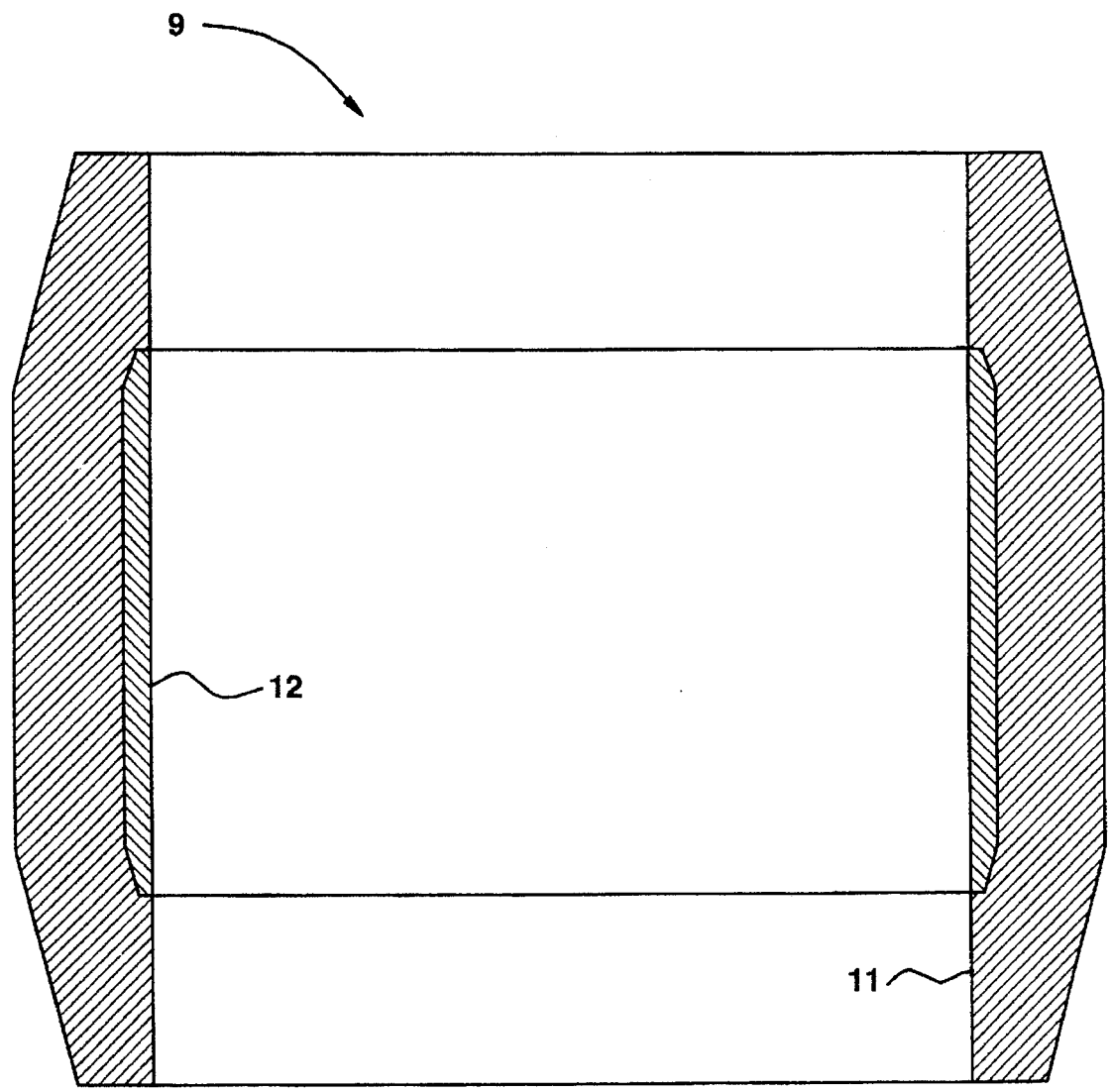
Figure 3B:
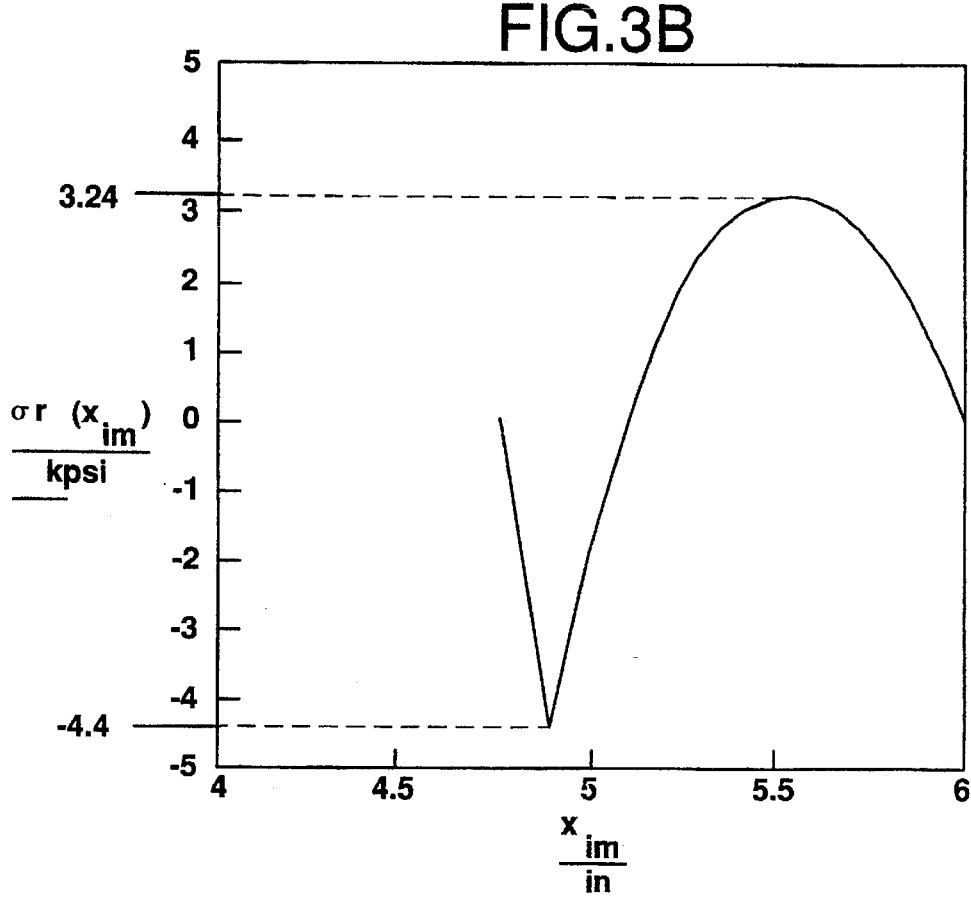
FIG. 3B illustrates radial stress and FIG. 3C illustrates tangential stress in the cylindrical portion shown in FIG. 3A.
Figure 3C:
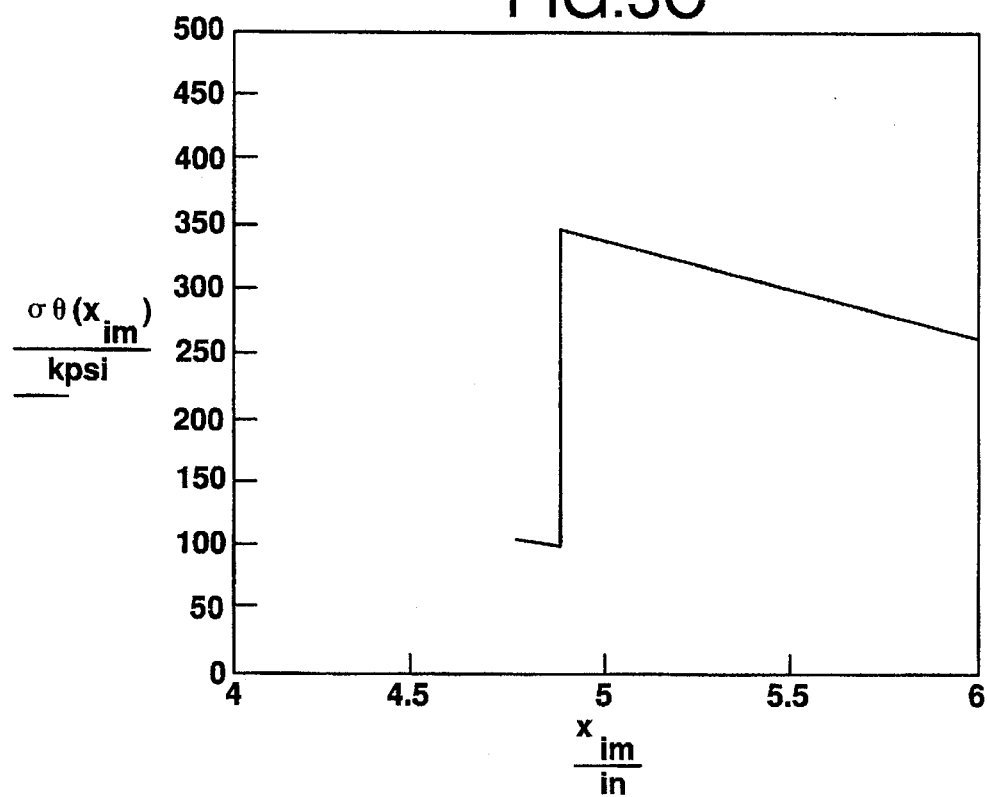

Preferably, rotor 4, which is shown in more detail in FIG. 2, includes two major elements, an outer, primarily cylindrical portion 9, which in an exemplary case is 12 inches long, and a hub portion 100 including a conical member 13 and an inner cylindrical member 15. The primarily cylindrical portion 9, which is shown in FIG. 3A, consists of two elements, an outermost member 11, which preferably is a filament wound composite using the highest strength graphite fiber available to sustain the centrifugal acceleration of one million G's and an inner cylinder member 12, which is a filament wound fiberglass composite, whose combination of density and modulus of elasticity create a moderate compressive load on the outermost member 11. This advantageously minimizes the radial tension in the outermost member 11. The radial and tangential stresses achieved with this material are shown in FIGS. 3B and 3C, respectively. These stresses, calculated at a central section of the cylinder, advantageously are well within the allowable stresses for the material systems described.

The highest strength graphite fiber, which is used in fabrication of outermost member 11, advantageously has a minimum tensile strength of about 924,000 lb/in$^2$ (924 kpsi) while the wound fiberglass used in the fabrication of inner cylinder member 12 has a tensile strength of about 500 kpsi. It should be noted that the moderate strength graphite fiber used in conical member 13 has a minimum tensile strength of about 714 kpsi. High strength aluminum with a minimum tensile strength of about 75 kpsi advantageously can be used in the construction of the hub portion 100, as discussed in greater detail below.

Figure 4:
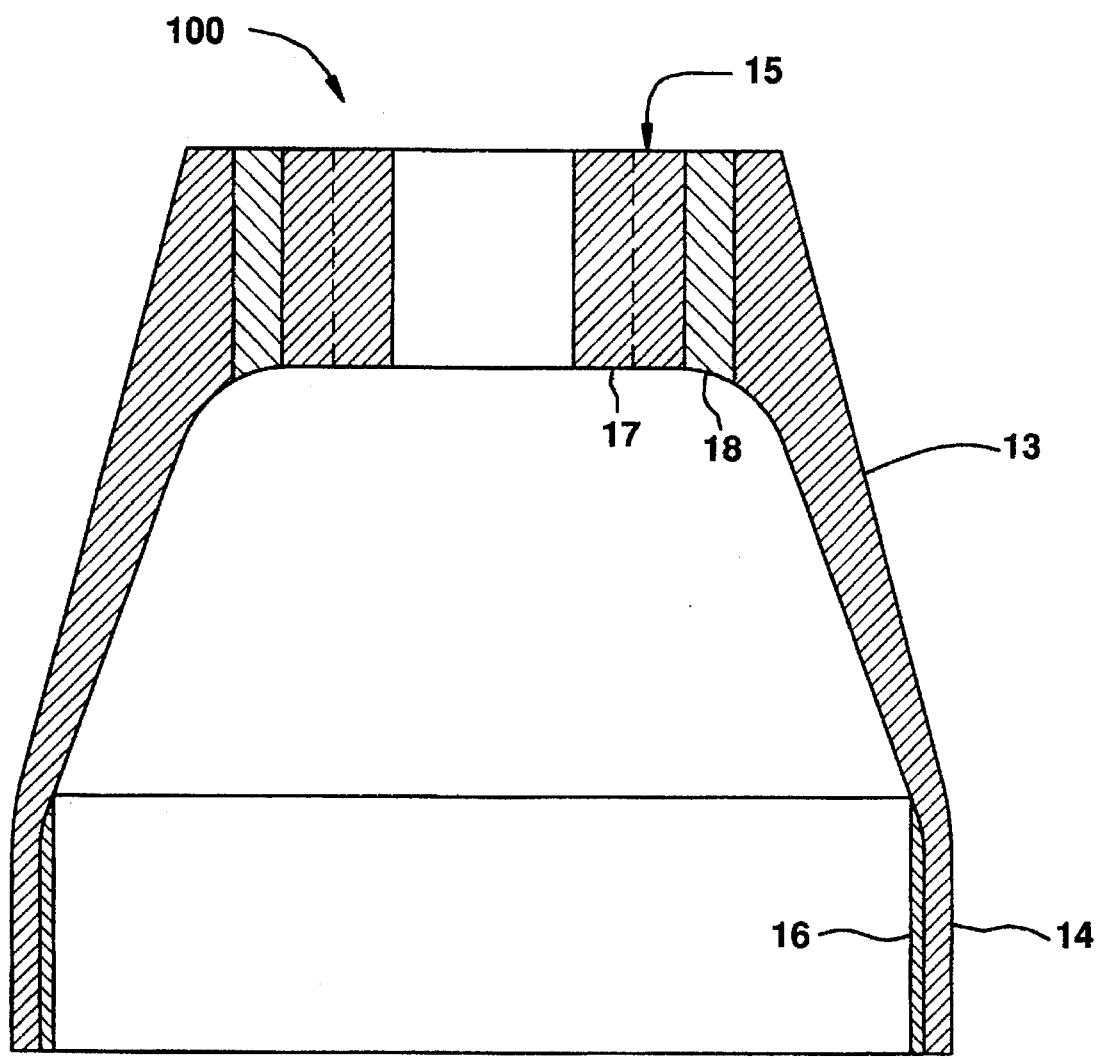
FIG. 4 is another illustrative view of the hub portion of the flywheel illustrated in FIG. 2.

The hub portion 100, shown in FIG. 4, consists of an outer, cylindrical member 14, a conical member 13, and an inner cylindrical member 15. Members 14 and 13 are preferably filament wound composites using a lower strength, i.e., lower cost, graphite fiber than the outermost member 11. A thin fiberglass filament wound cylinder member 16 forms the inner surface of member 14.

Figure 5:
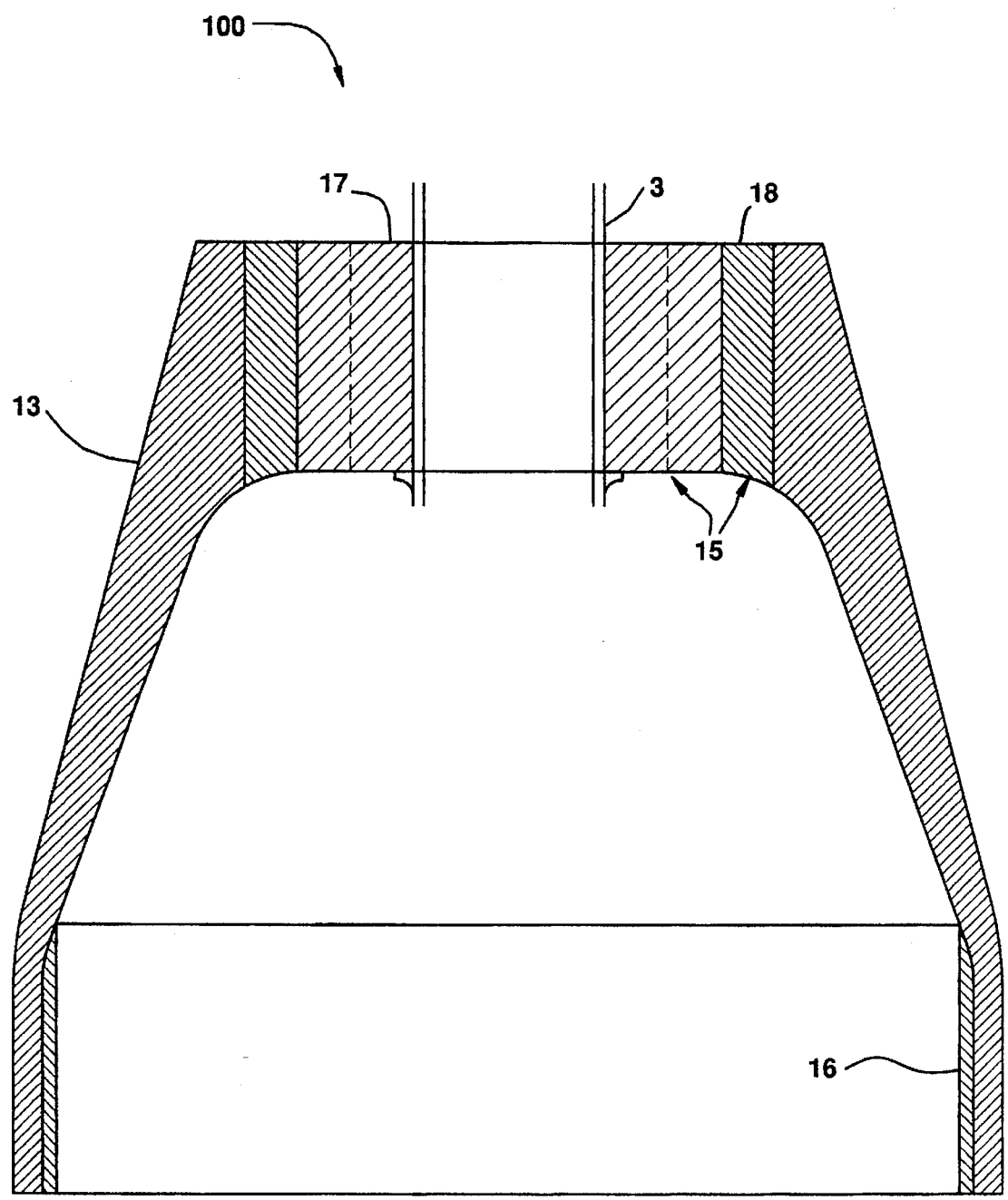
FIG. 5 is an additional expanded view of the hub portion shown in FIG. 4.
Figure 6A:
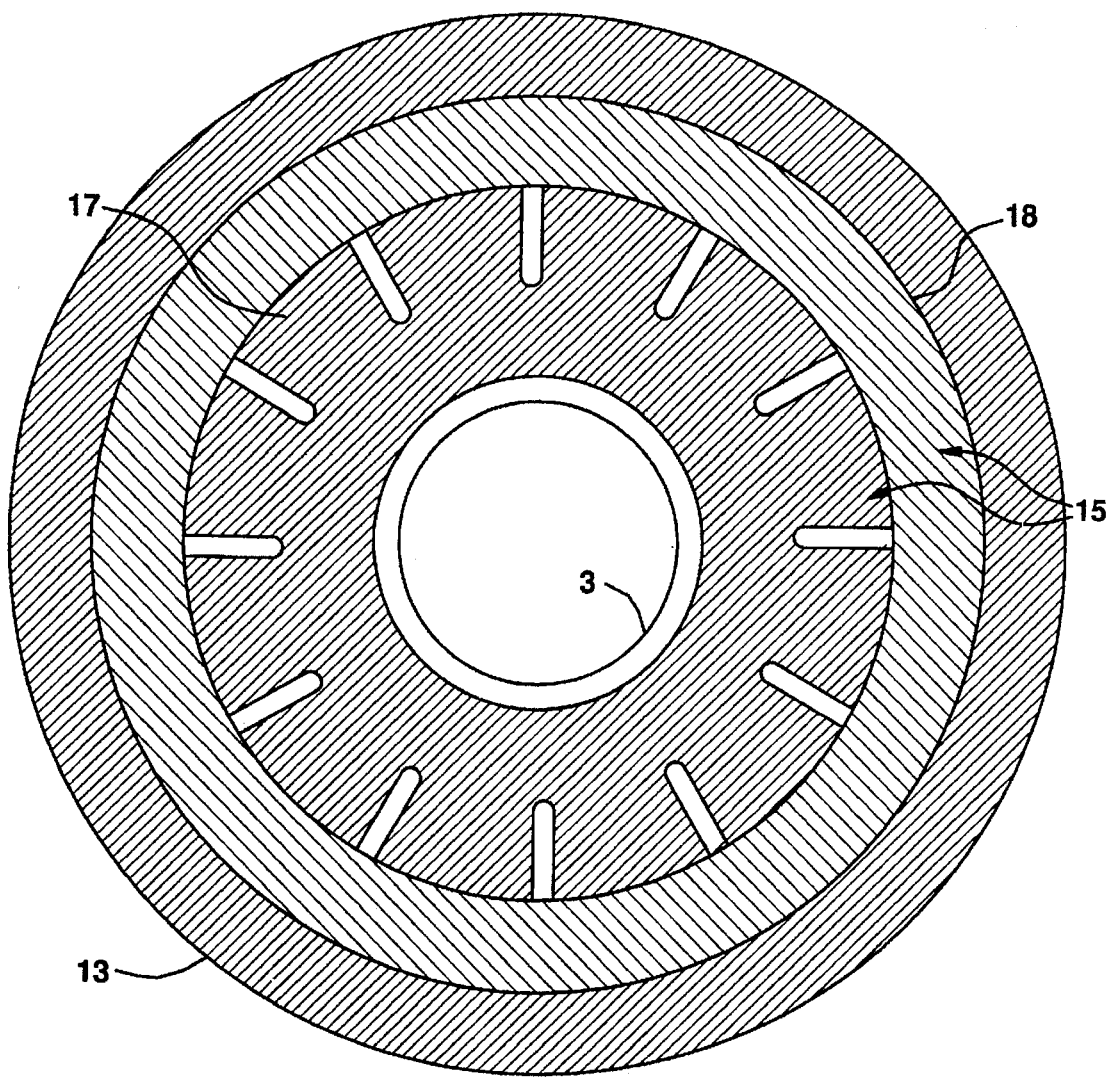
Figure 6B:
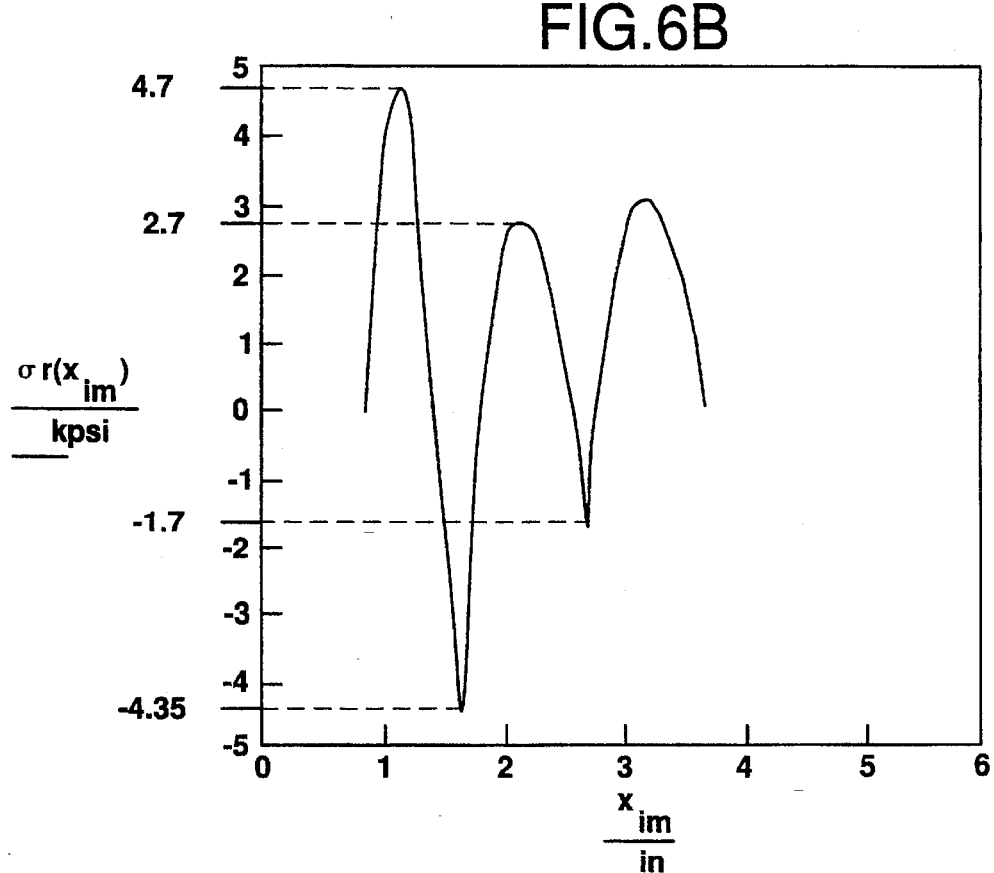
FIGS. 6B and 6C illustrate radial and tangential stresses, respectively, of the inner cylindrical member of the hub portion shown in FIG. 6A.
Figure 6C:
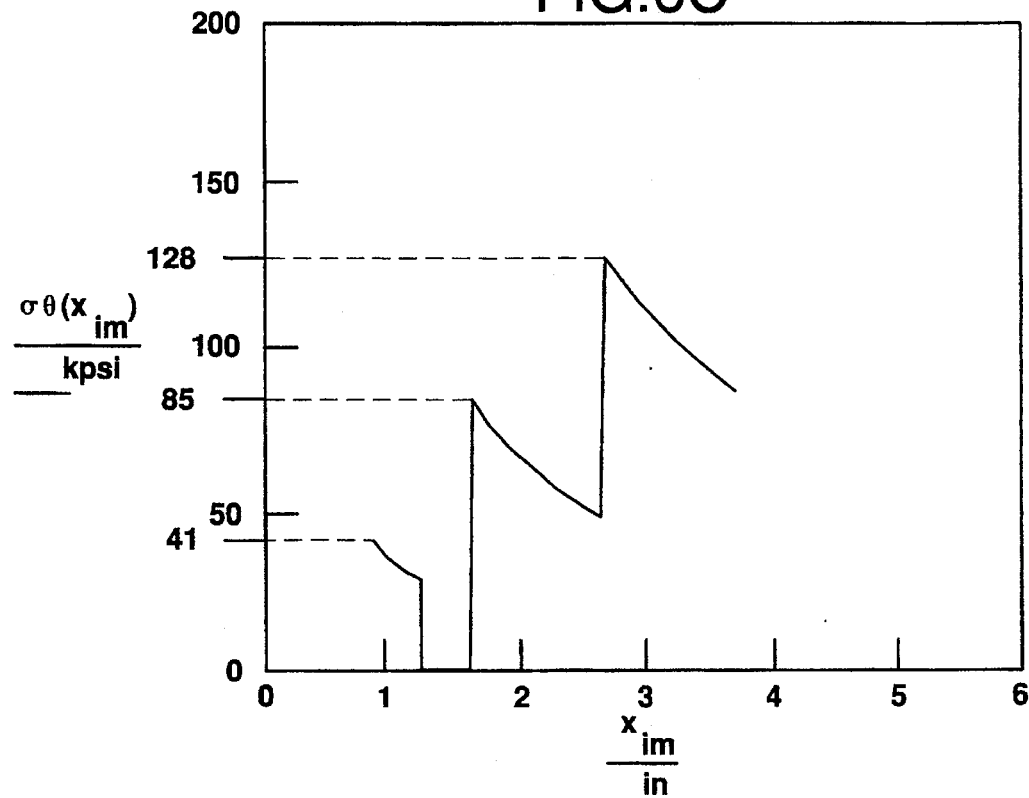

Details of member 15 of the hub portion 100 are shown in FIGS. 5 and 6A. Member 15 consists of a slotted aluminum cylinder 17 and a filament wound fiberglass composite cylinder member 18 which bridge the radial distance between the shaft 3 and the conical member 13 of the hub portion 100. Preferably, this maximizes the inner radius of member 13 while minimizing its cone angle, thus making it easier to wind. The calculated radial and tangential stresses in member 15 are shown in FIGS. 6B and 6C, respectively. This choice of materials and geometry keeps the radial stresses in this member well within allowable limits.

Moreover, this arrangement advantageously provides a low cost way to bridge the space between the shaft 3 and the conical member 13, while keeping the radial stresses very low and concurrently making the low cone angle possible.

Figure 7A:
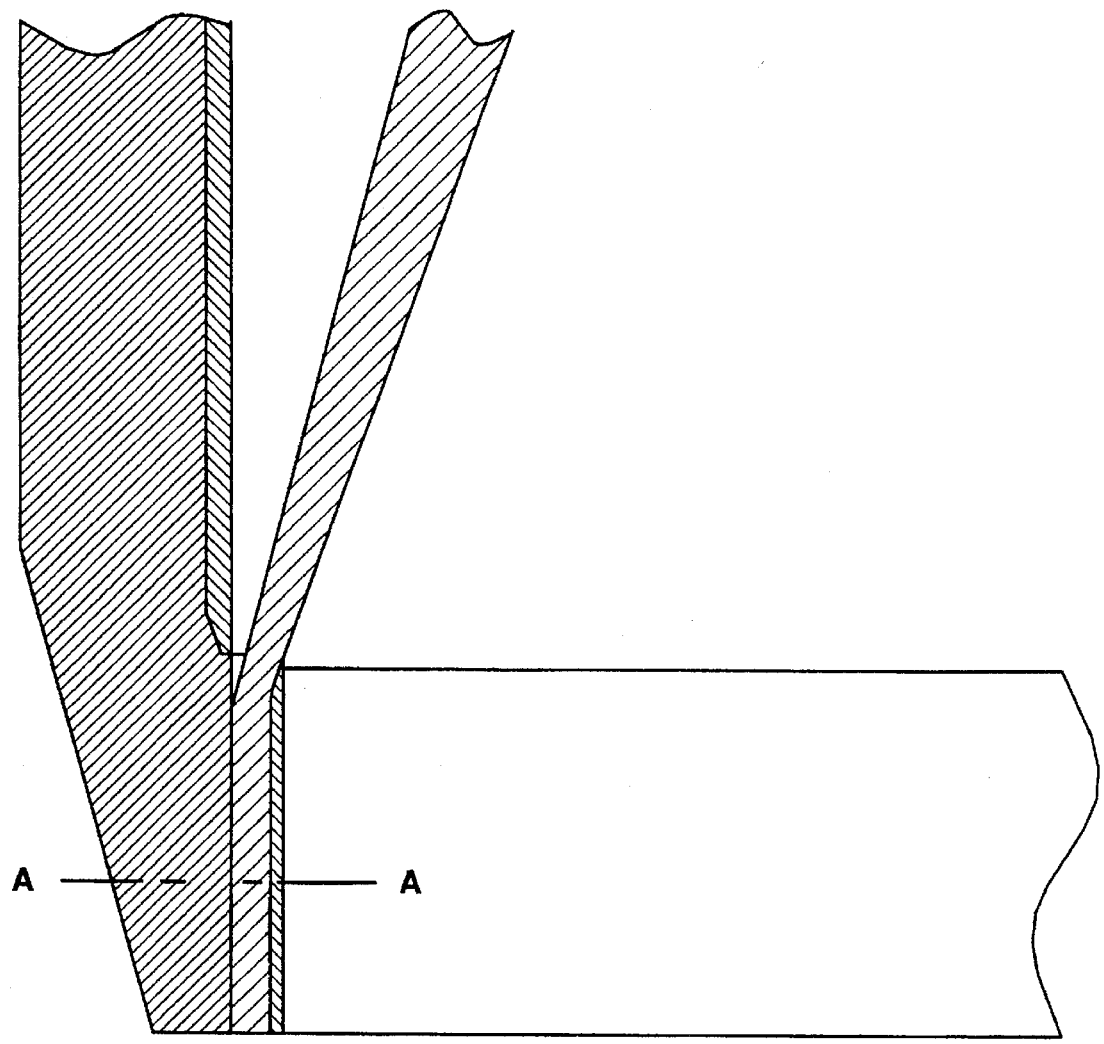
Figure 7B:
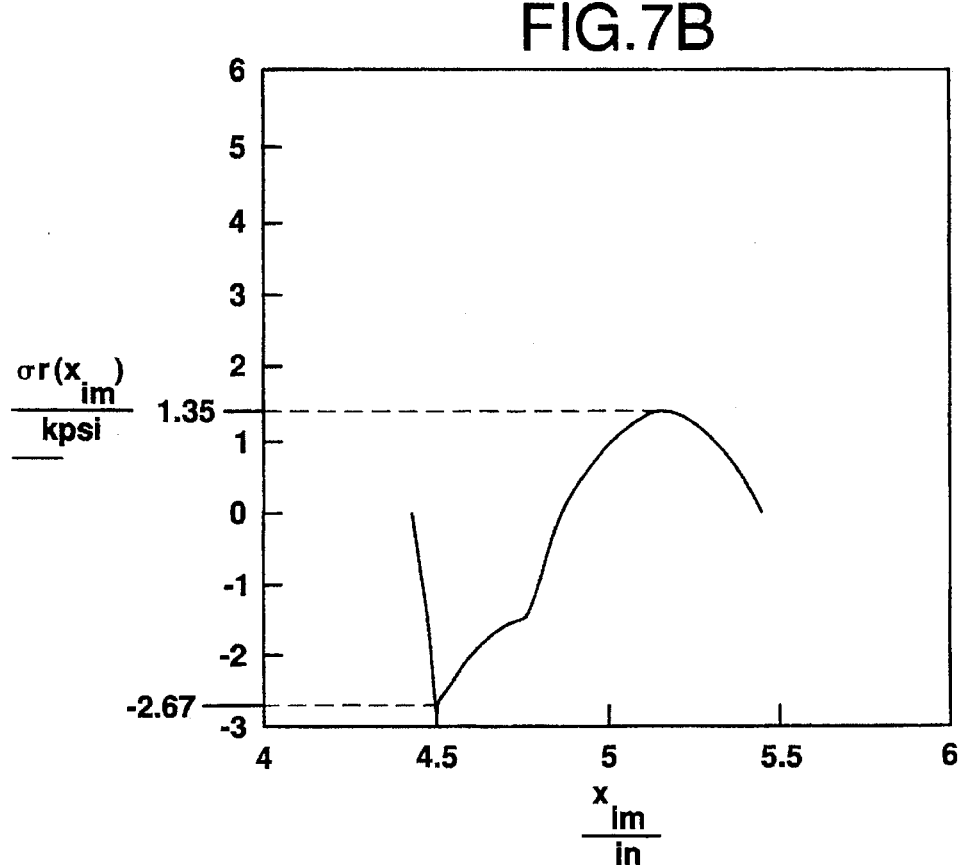
FIGS. 7B and 7C illustrate radial and tangential stresses found along the line A-A shown in FIG. 7A.
Figure 7C:
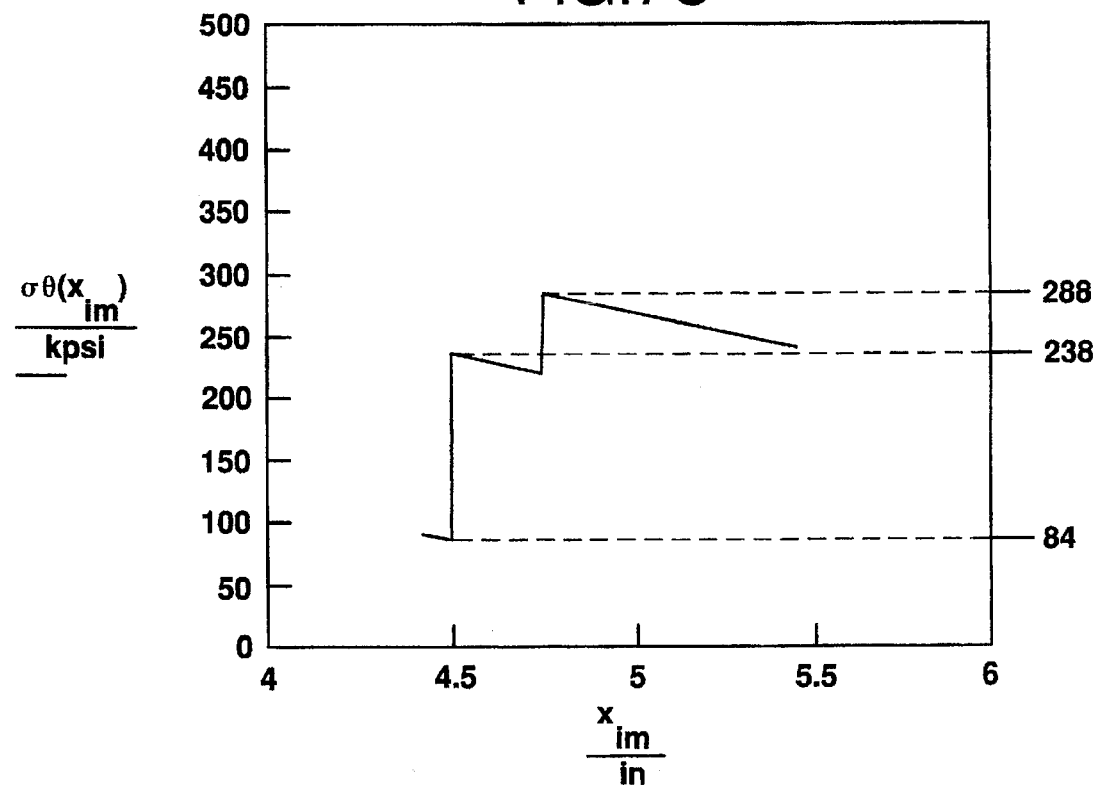

The junction of member 14 of the hub portion 100 with the outermost member 11 is shown in FIG. 7A. The three materials disposed along the Line A—A, e.g., fiberglass, moderate strength graphite, and high strength graphite, advantageously create the desired combination of stiffness and density in this portion of the radius while keeping the radial stresses low. The radial and tangential stresses along this line are shown in FIGS. 7B and 7C, respectively. These stresses advantageously are well within the allowable limits for the respective materials.

Figure 9:
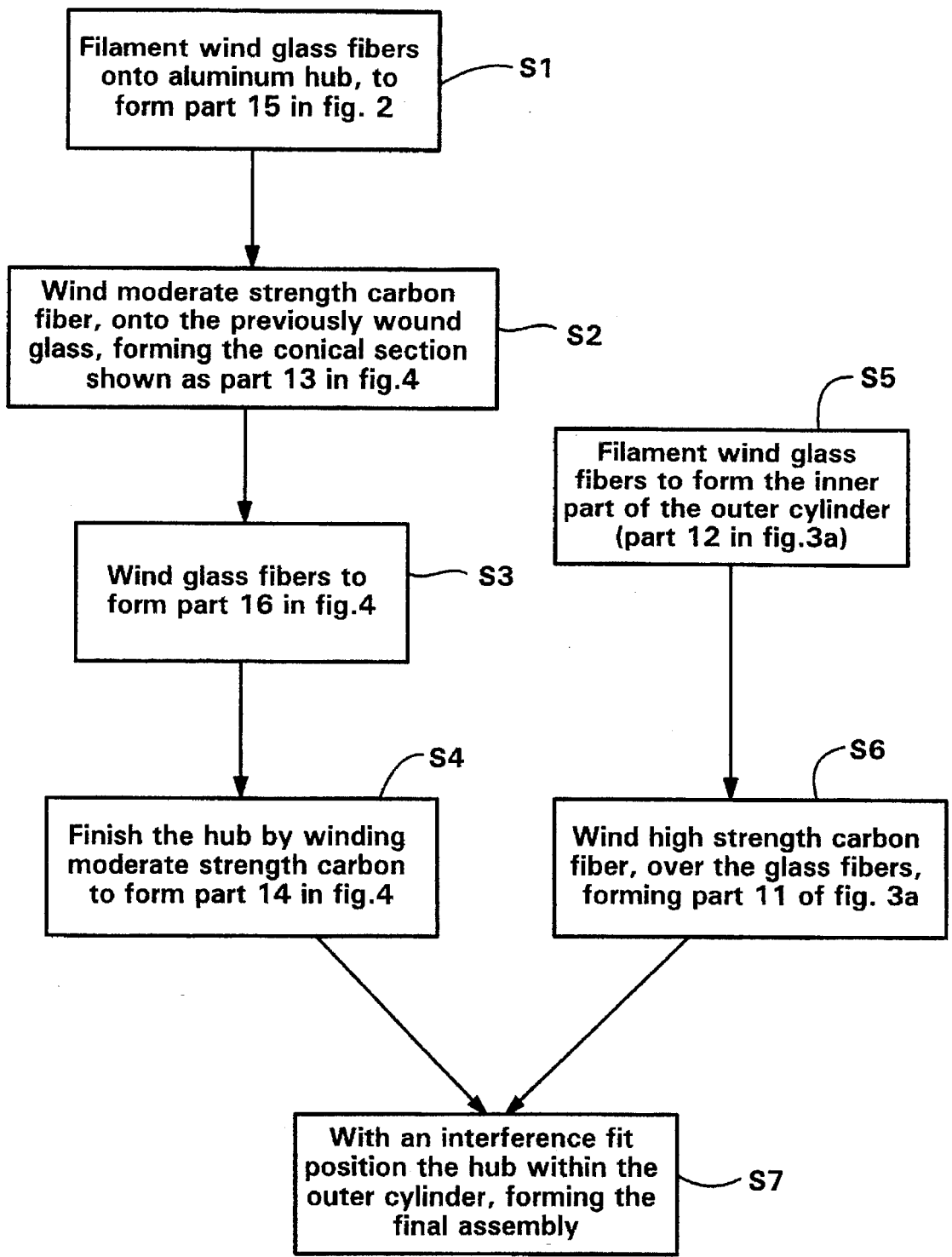
FIGS. 9 and 10 are high-level block diagrams illustrating alternative methods for fabricating the rotor according to the present invention.

The rotor 4 advantageously can be fabricated as two separate pieces, the hub portion 100 shown in FIG. 4 and the outer cylindrical portion 9 shown in FIG. 3A. These two pieces advantageously are then mated with an interference fit. The sequence of events for this procedure is shown in FIG. 9 and discussed in greater detail below. In this two piece method, the fiberglass part, shown as member 16 in FIG. 4, provides mass loading, which ensures compression between the two portions during rotation.

Figure 10:
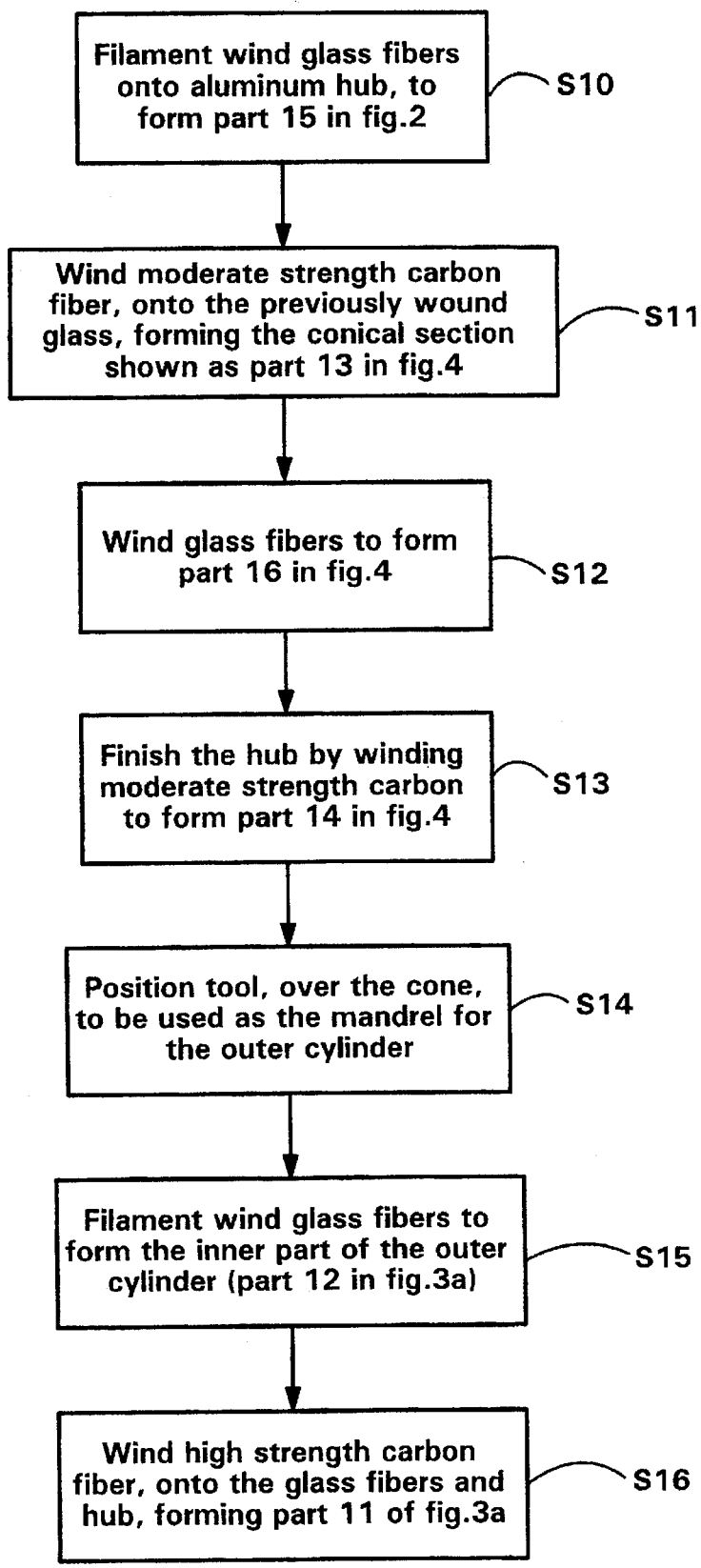

An alternative to the two piece method is to wind the cylinder right onto the hub, resulting in termination of one integral piece. The sequence of events for this method is shown in FIG. 10 and described in detail below.

As shown in FIG. 9, manufacturing of the hub portion 100 includes a step S1 for winding filament glass fibers onto an aluminum cylinder to form inner cylindrical member 15 of hub portion 100. During step S2, a moderate-strength carbon fiber is wound onto the inner cylindrical member 15, prepared according to step S1, to form the conical member 13 of hub portion 100. During step S3, a glass fiber is wound to form the wound cylindrical member 16 at the extreme end of conical member 13. During step S4, the hub portion is finished by winding moderate-strength carbon fibers wound around cylindrical member 16 to form the outer cylindrical member 14 attached to conical member 13.

Separately, filament wind glass fiber is wound on a spindle to form the inner cylinder member 12 of the outer cylindrical portion 9, as shown in FIG. 3A. Subsequently, during step S6, a high-strength carbon fiber is wound over the glass fibers to form outermost member 11 of outer cylindrical portion 9, as shown in FIG. 3A.

When both the hub portion 100 and the outer cylindrical portion 9 have been prepared according to steps S1–S4 and steps S5–S6, respectively, the portions are interference fit to position the hub portion 100 within the outer cylindrical portion 9 to form the rotor 4 during step S7.

In an alternative method of manufacturing illustrated in FIG. 10, a filament glass fiber is wound onto aluminum hub member 15 as shown in FIG. 2 during step S10. Thereafter, during step S11, a moderate-strength carbon fiber is wound onto the previously wound glass fiber, forming the conical member 13 of hub portion 100. During step S12, glass fibers are wound to form a right circular wound cylinder member 16, as shown in FIG. 4.

Subsequently, during step S13, the hub portion 100 is finished by winding a moderate-strength carbon fiber onto wound cylinder member 16 to join up with the lower-strength carbon fiber forming conical member 13. During step S14, a tool, i.e., a circular cylinder, is positioned over the conical member 13. The tool serves as a mandrel for supporting the outer cylindrical portion 9 during winding. During step S15, filament wind glass fibers form the inner cylinder member 12 of outer cylindrical portion 9. The rotor 4 is finished by winding high-strength carbon fiber onto the glass fiber forming outermost member 12 of FIG. 3A.

Figure 8:
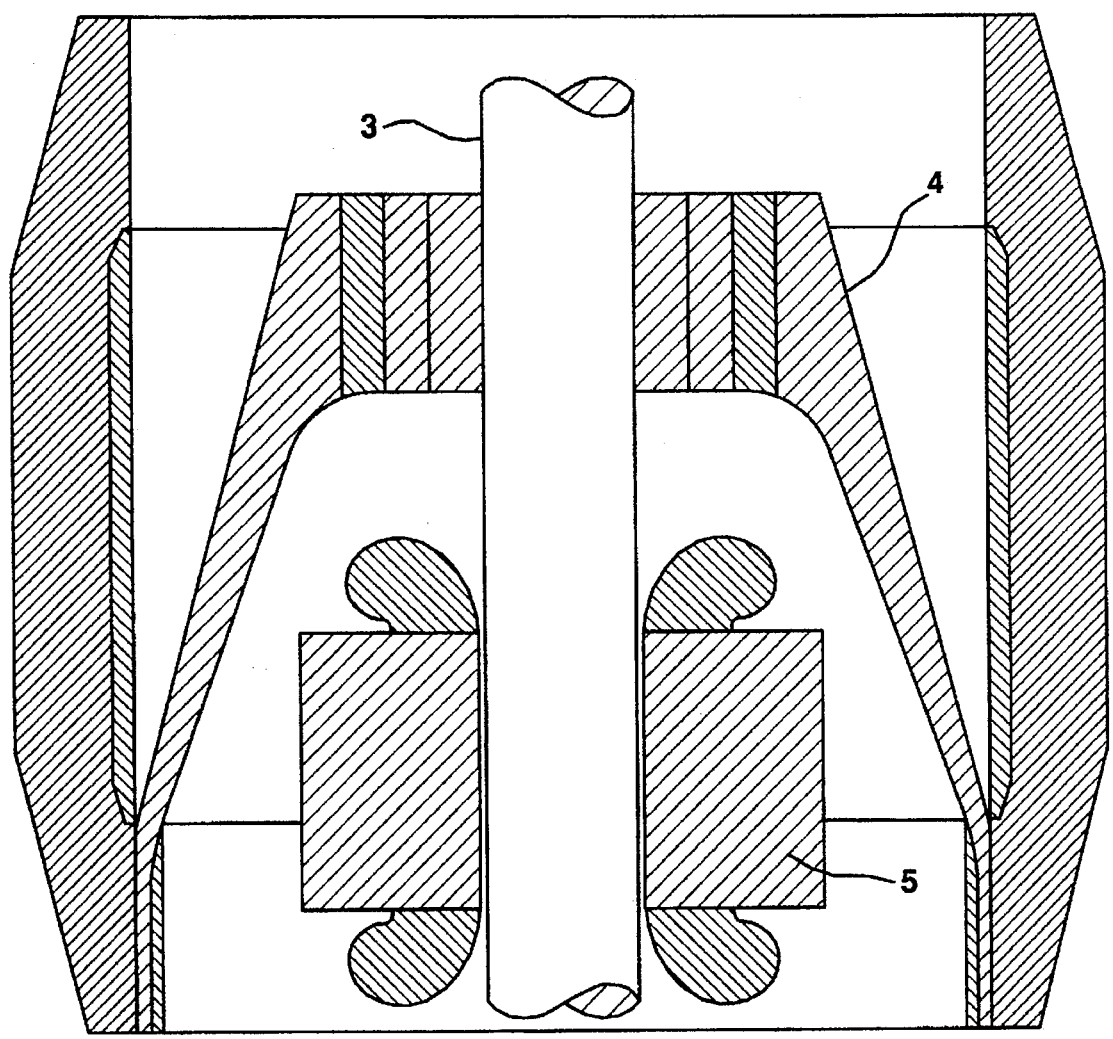
FIG. 8 is a detailed view of selected portions of the flywheel motor generator system illustrating the location of the motor generator with respect to the hub portion.

The location of the high power motor-generator 5 with respect to the hub portion 100 of rotor 4 is shown in FIG. 8. It will be appreciated that this efficient use of space is important in minimizing the volume and weight of the flywheel energy storage system, which is particularly important in mobile applications.

Although the design of member 15 of the hub portion 100 shown in FIGS. 5 and 6a is satisfactory up to its limiting speed, greater operating speed for the rotor 4 and, hence, greater energy density for the flywheel, may be achieved using either of two alternative embodiments described in greater detail below.

Figure 11:
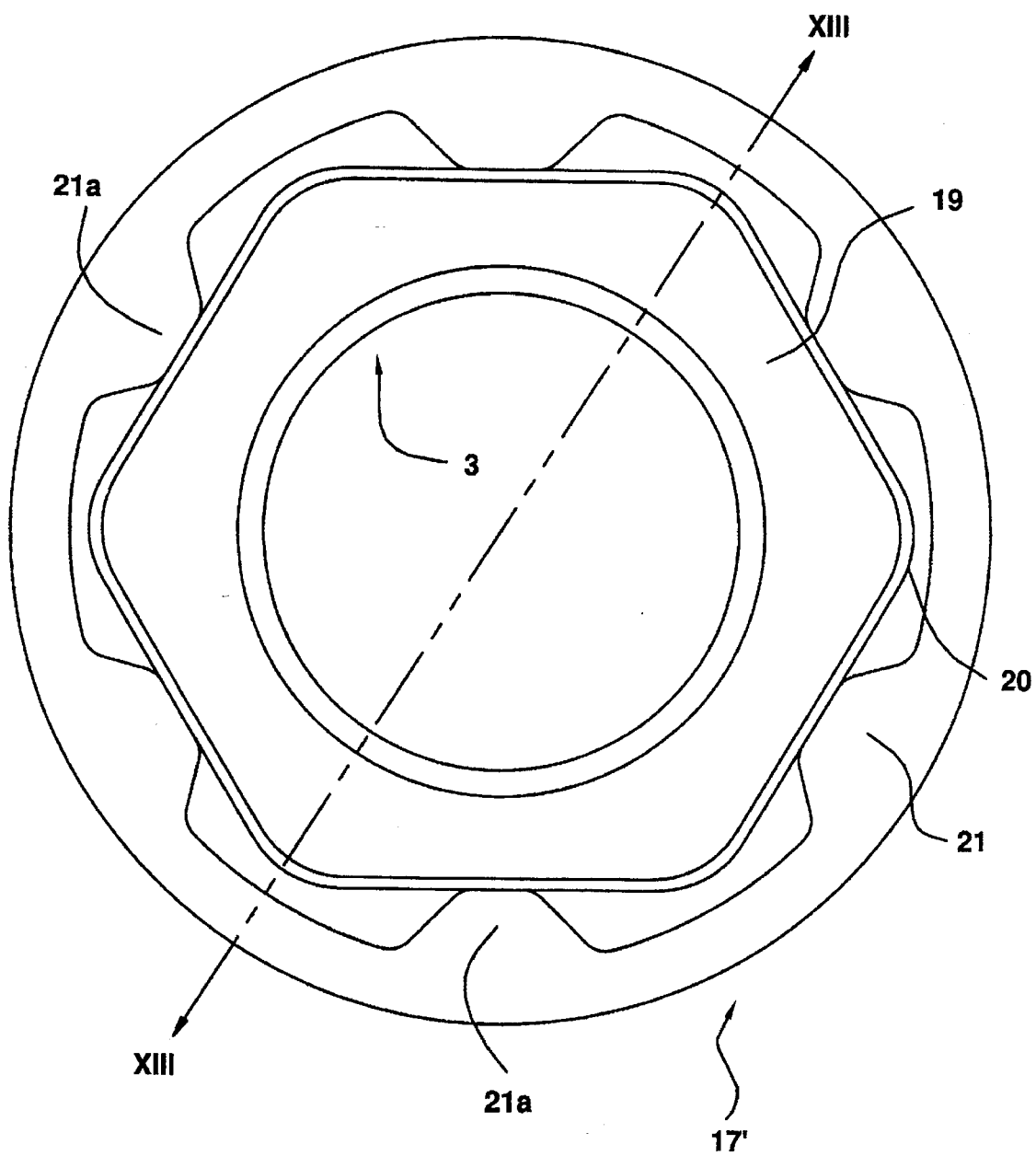
FIGS. 11 and 12 are top views of the hub portion according to another preferred embodiment of the present invention illustrating spring 20 in its concave and convex attitudes, respectively.
Figure 12:
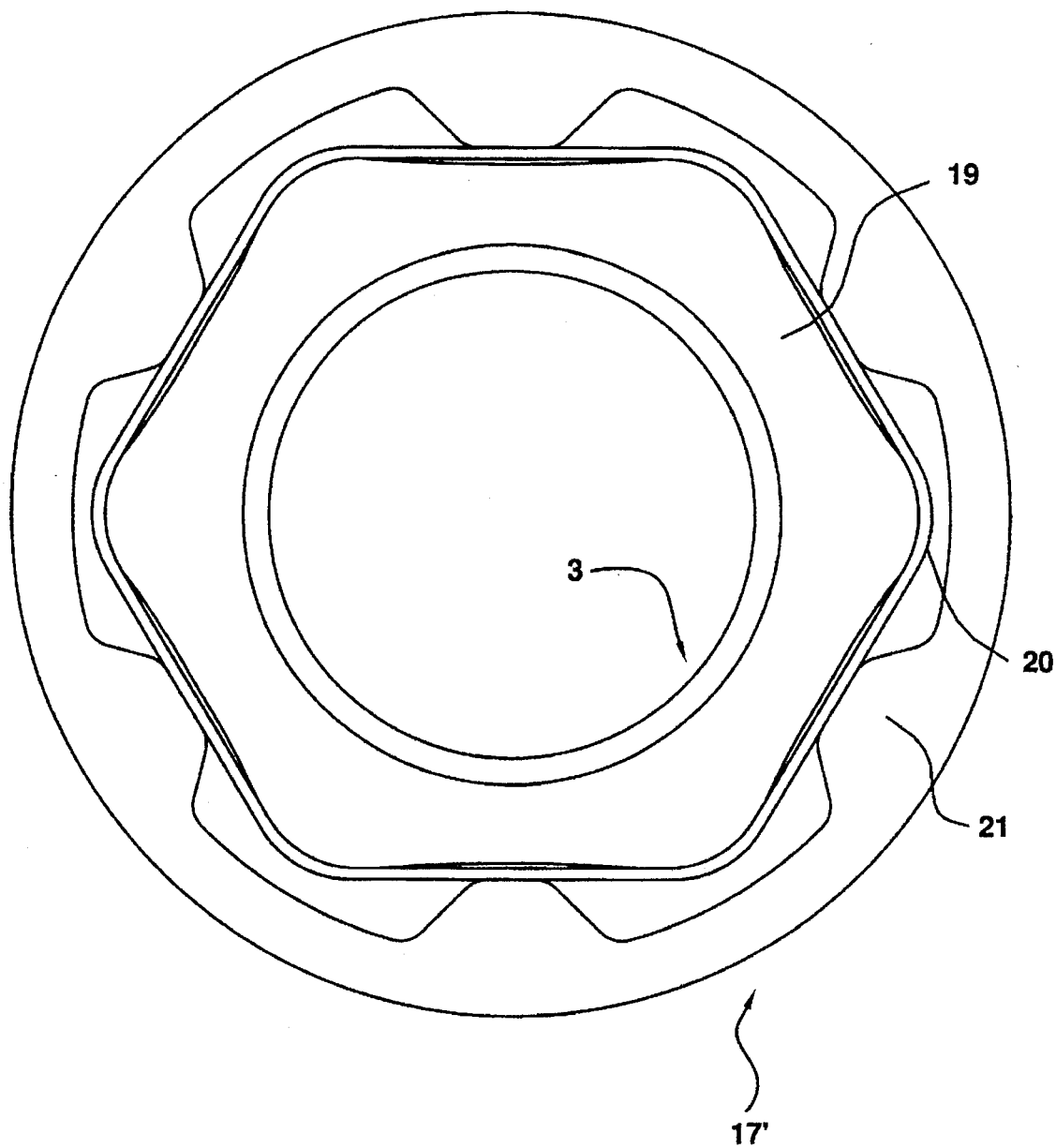

In a second preferred embodiment, the slotted aluminum cylinder 17 of FIG. 5 advantageously can be replaced by a multi-piece cylinder 17' including aluminum cylinder 19 having a generally hexagonal outer surface, as shown in FIGS. 11 and 12. It should be noted that the surfaces of the cylinder are slightly concave, as will be discussed in greater detail below. Preferably, cylinder 19 is surrounded by a thin walled, hoop wound graphite fiber composite spring 20, which, in turn, is bonded to inwardly pointing teeth 21a of a plastic member 21. The outer surface of member 21 coincides with and is bonded to the inner surface of the filament wound fiberglass composite cylinder member 18.

Figure 16:
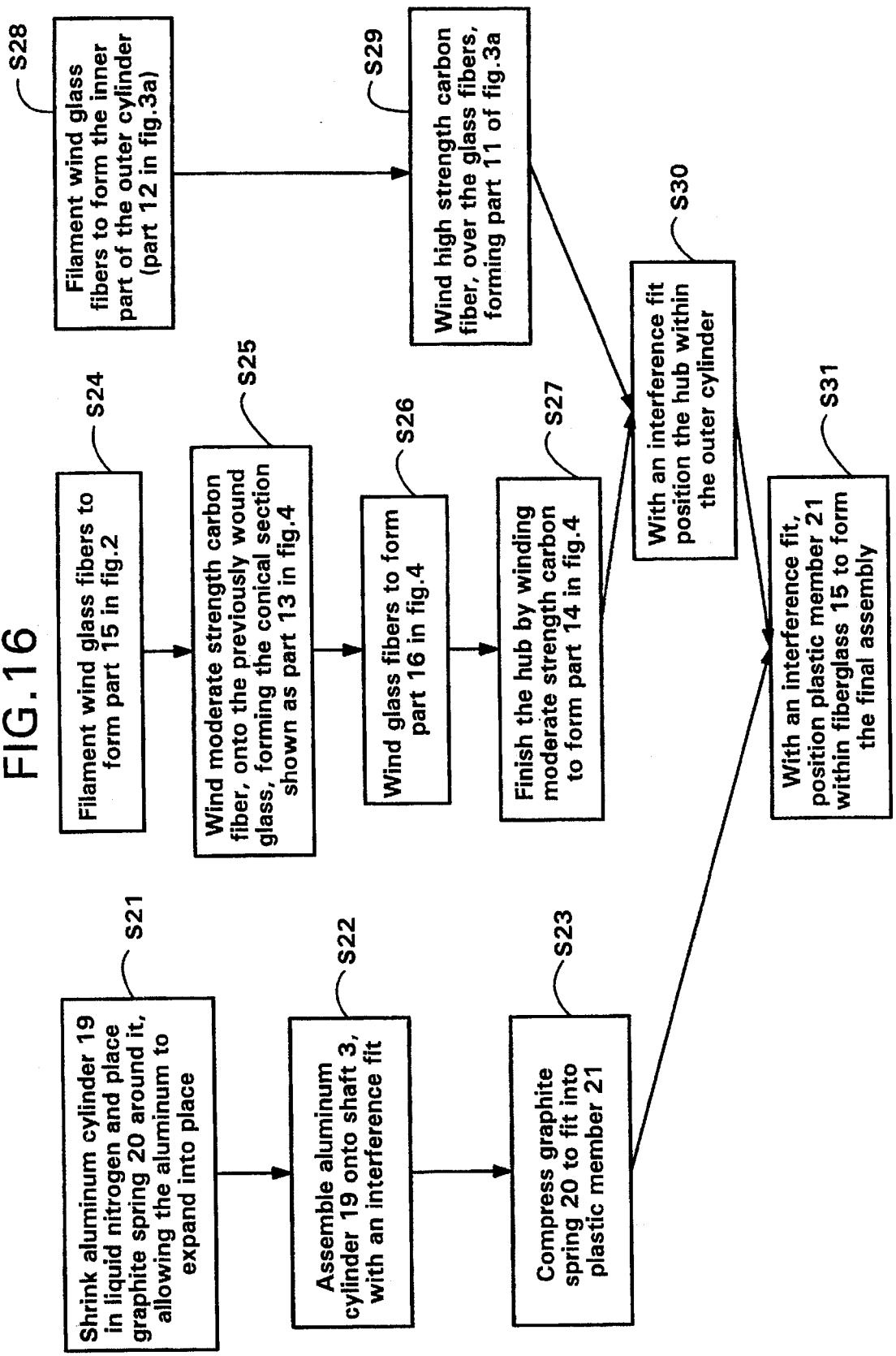
FIGS. 16, 17, 18 and 19 are high-level block diagrams illustrating additional alternative methods for fabricating the rotor according to other preferred embodiments of the present invention.
Figure 17:
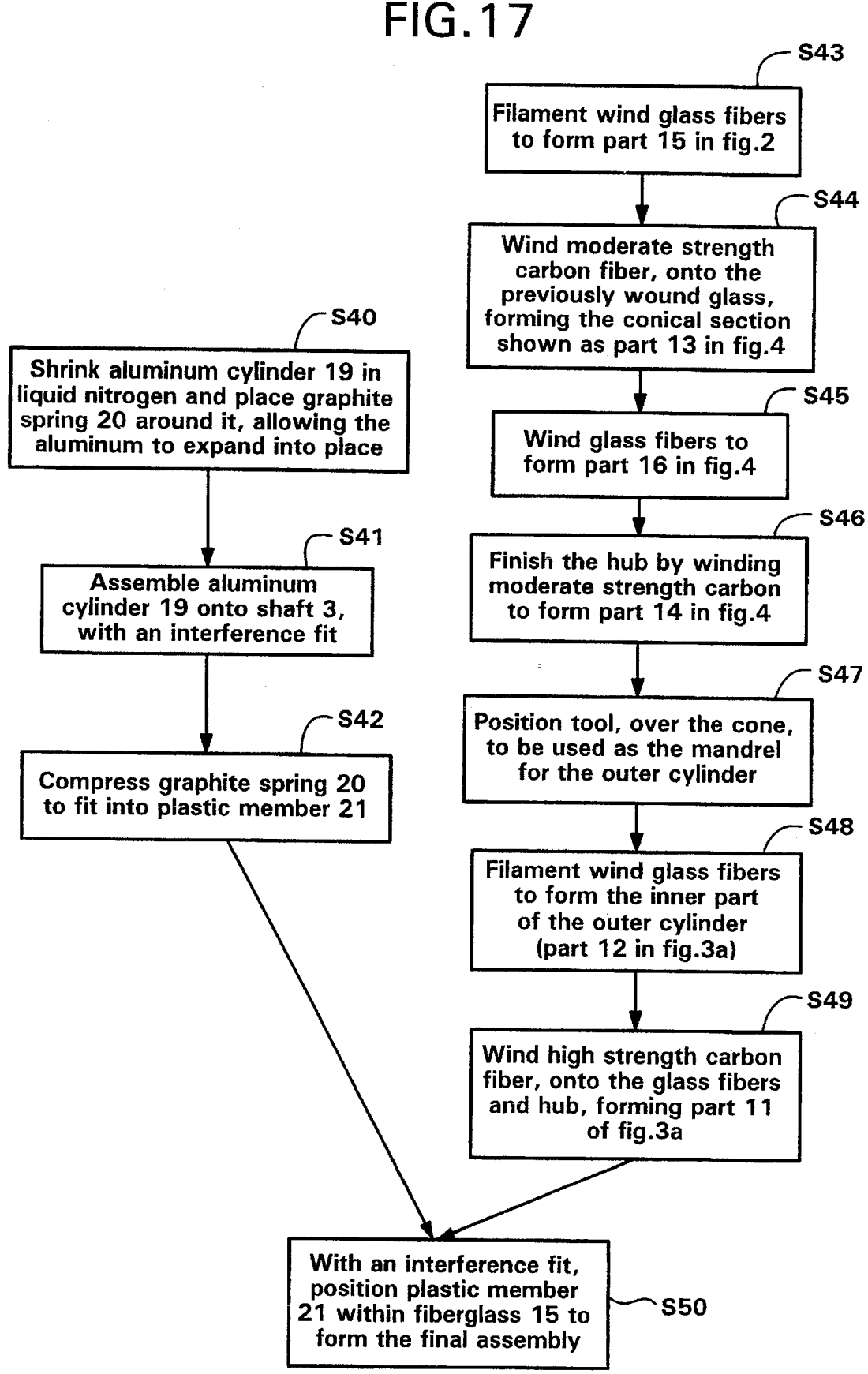

FIGS. 16 and 17 are flow charts illustrating two alternative methods of assembling the rotor according to the second preferred embodiment. Spring 20 is assembled onto hexagonal cylinder 19 by thermal bonding, i.e., cooling hexagonal cylinder 19 in liquid nitrogen before spring 20 is placed around hexagonal cylinder 19. It will be appreciated that as cylinder 19 warms up and expands, cylinder 19 stresses spring 20 to a predetermined level of tension so that a firm connection between these two members 19, 20 is provided by friction in the regions proximate to the rounded corners of the hexagonal cylinder 19.

Figure 13A:
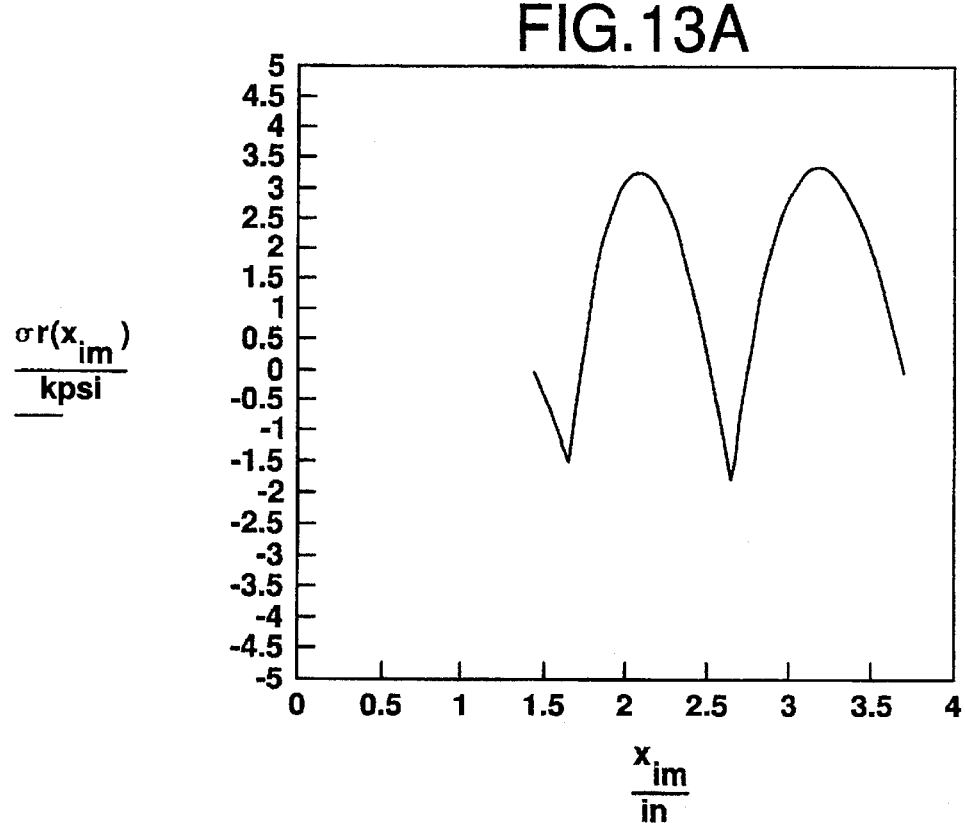
FIGS. 13A and 13B illustrate radial and tangential stresses found along the cut line XIII—XIII shown in FIG. 11.
Figure 13B:
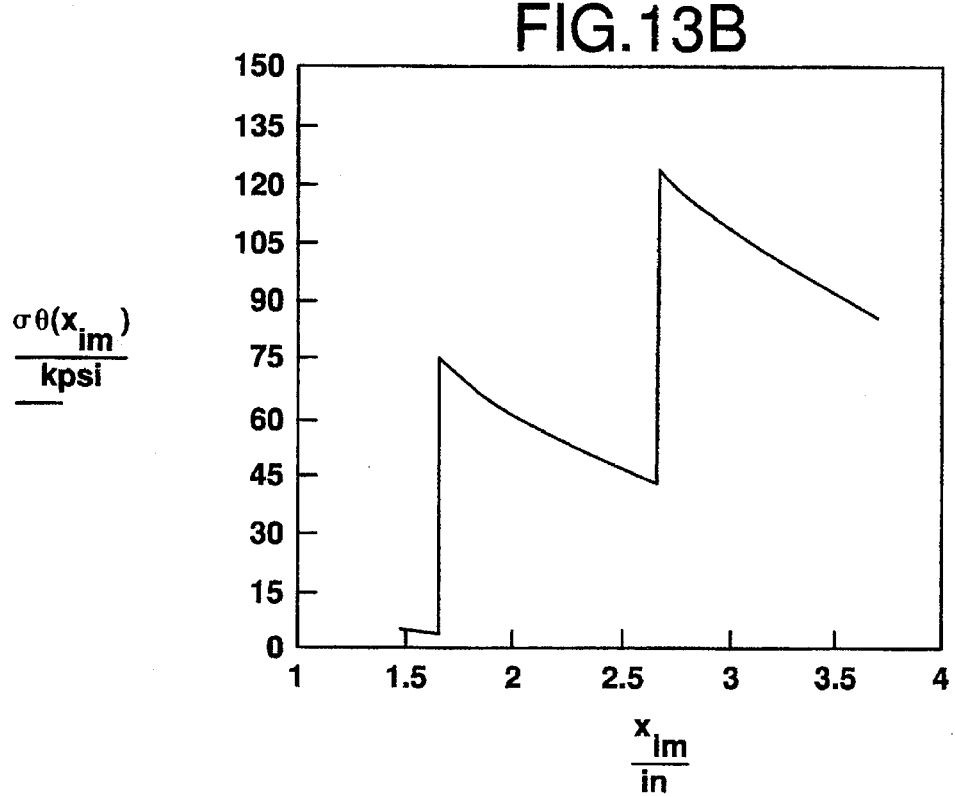

When the rotor 4 is at rest, i.e., non-rotating, the shape of the spring 20 within multi-piece cylinder 17' is as shown in FIG. 11, i.e., compressed inward by the teeth 21a on member 21 to bear against the concave surfaces of cylinder 19. At a maximum operating speed of 8000 radians per second, the differential radial growth of members 19 and 21 allows the spring 20 to bend outwardly to achieve the slightly convex shape illustrated in FIG. 12. Spring 20's design advantageously permits multi-piece cylinder 17' to accommodate radial growth without being over stressed. This is accomplished by making spring 20 relatively thin and by dividing its ranges of motion into concave and convex regimes. The fiber stresses in the spring 20 are caused by a bending change sign, i.e., from tension to compression or vice versa, in going from a concave to a convex shape. This effect advantageously reduces the stress in spring 20, and provides an ample margin of safety relative to spring 20's maximum allowable stress. Spring 20 preferably provides the radial connection between the inner and outer portions of the composite cylinder 17', minimizing radial stresses in the composite members despite substantial radial growth of members 19, 21 associated with high tangential stresses. The radial and tangential stresses for inner cylindrical member 15 are shown in FIGS. 13a and 13b, respectively.

It should be noted that while spring 20 is compliant relative to radial growth, as described above, since the thin walled spring 20 is relatively soft with respect to bending, spring 20 is also very stiff relative to lateral translational motion. This is an important design features, since it is desirable to keep the mechanical resonance frequency of the rotor 4, which is proportional to the square root of the translational stiffness, above the highest rotational frequency. The high translational stiffness results from the geometrical arrangement of multi-piece cylinder 17', which requires stretching of the stiff graphite fibers in at least four of the six faces of hexagonal member 19 to accompany any translational motion.

FIG. 14 is a sectional view wherein along line XIII—XIII of multi-piece cylinder 17' showing the interference fit of the axial extensions 19a of the hexagonal cylinder 19 with the steel shaft 3. The interference fit preferably is achieved by pressing one part on the other, using a slight conical taper on each. It may also be achieved by thermally shrinking the shaft before assembly.

Figure 15:
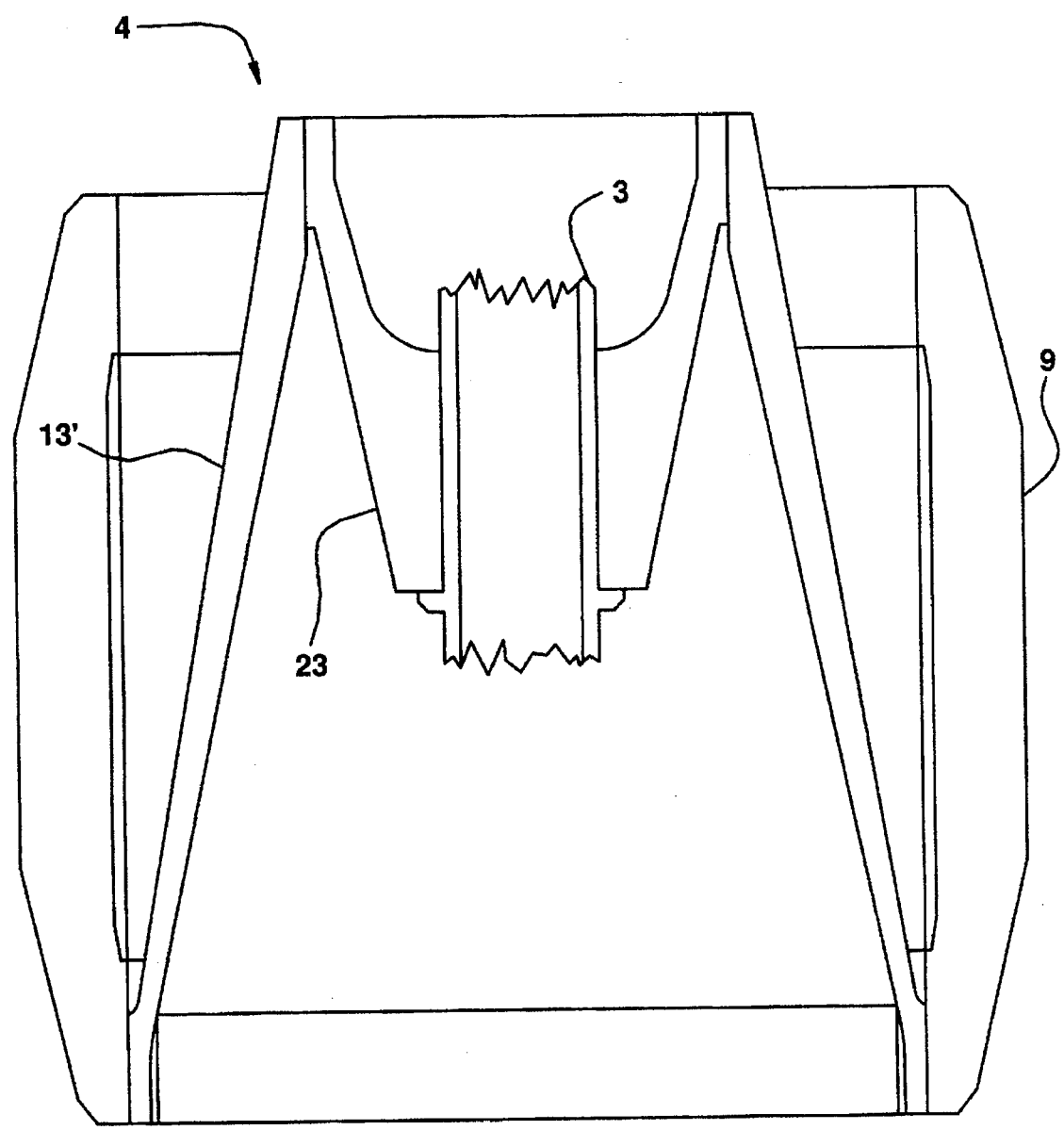
FIG. 15 is an illustration which is useful in understanding another preferred embodiment according to the present invention.

FIG. 15 shows the flywheel rotor 4 according to yet another preferred embodiment according to the present invention. In this embodiment, a smaller inner cone 23 is advantageously positioned radially inward of a conical member 13', which is similar to the conical member 13, described above. The purpose of the conical shape is to mechanically couple the outermost cylinder 9 to the shaft 3 without producing high radial stresses resulting from thick radial sections. The conical shapes 23, 13' maintain sections thin enough such that radial stresses remain sufficiently low. While it is possible to allow the conical member 13' to continue axially until it reaches the shaft 3, allowing a simpler design with only one cone, it will be appreciated that this would require a longer shaft and more space inside the vacuum housing 2. By changing the direction of the cone's slope, i.e., including the smaller inner conical section 23, a rotor 4 occupying the same space according to the two embodiments described above can be achieved.

Figure 18:
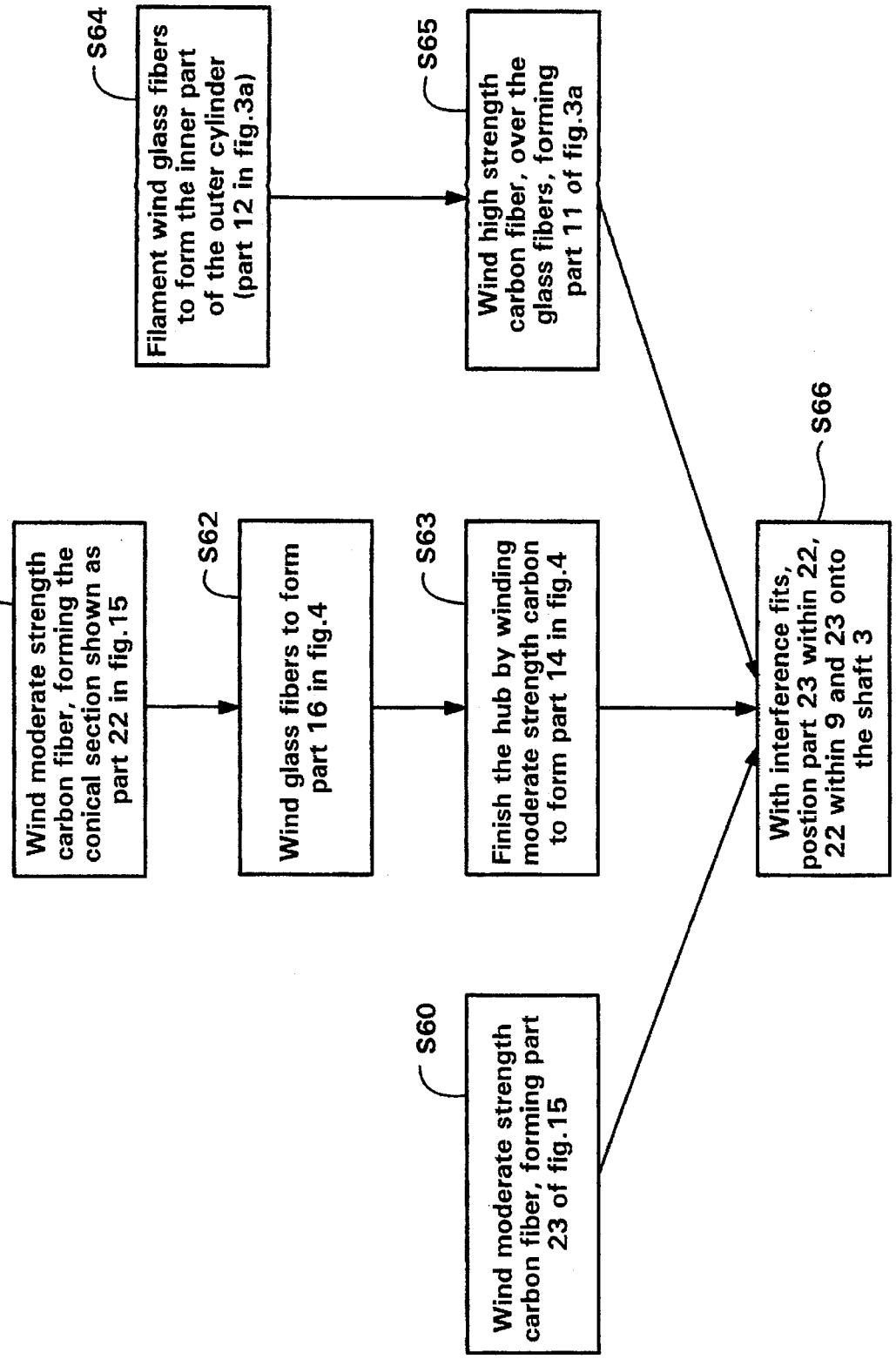
Figure 19:
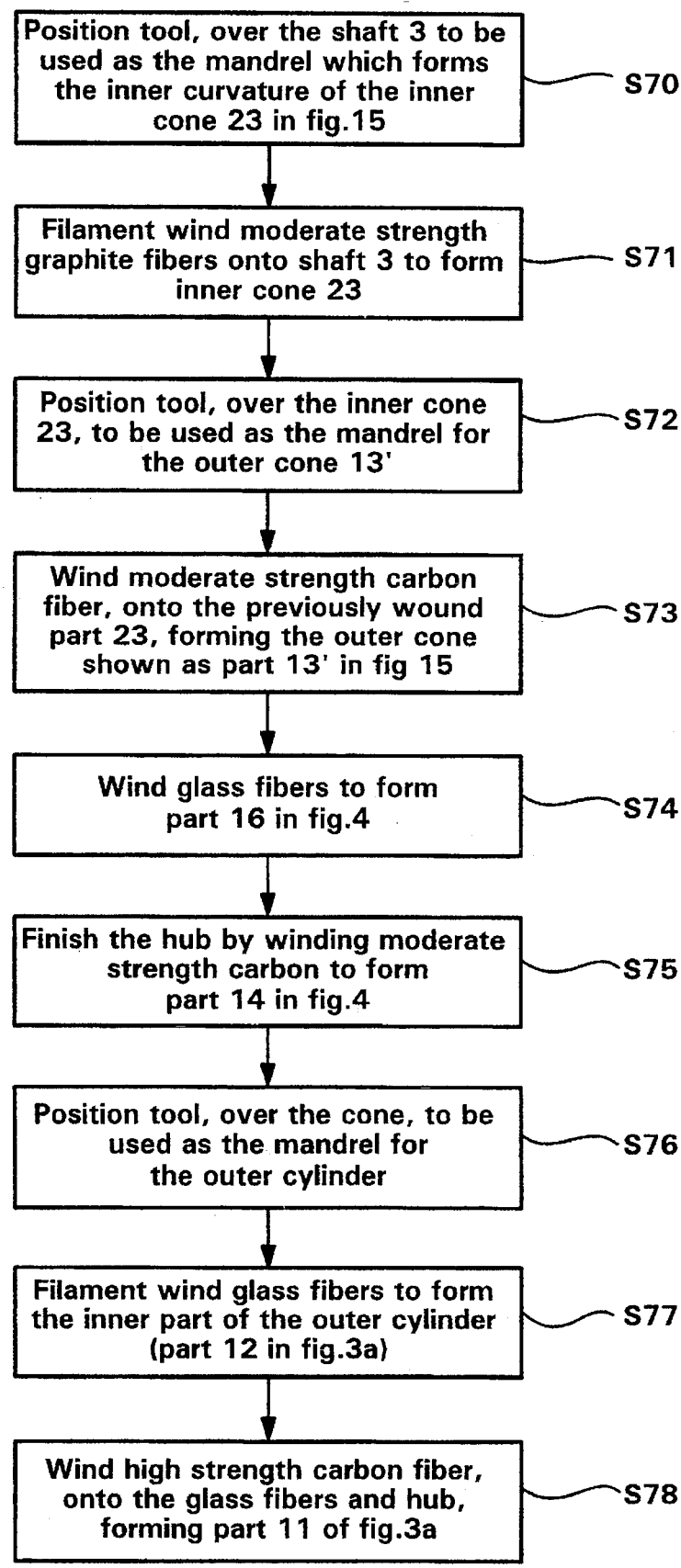

The dual or folded conical 23, 13' configuration described above can advantageously be made of two separately wound cones which are then assembled with an interference fit using a slight conical taper. This method of manufacture is described in the flow charts illustrated in FIG. 18 and FIG. 19.

As shown in FIG. 16, manufacturing of the hub portion 100 includes a step S21 for fabricating the multi-piece cylinder 17, wherein the hexagonal aluminum cylinder 19 is cooled in a liquid nitrogen bath, graphite spring 20 is placed around hexagonal cylinder 19 and cylinder 19 is allowed to re-expand. During step S22, hexagonal cylinder 19 is interference fit on shaft 3 while during step S23, graphite spring 20 is compressed to a size allowing insertion of cylinder 19, spring 20 into plastic member 21.

Simultaneously, glass fibers are wound to form inner cylindrical member 15, shown in FIG. 2. Subsequently, moderate strength carbon fibers are wound onto the previously wound glass so as to form conical section, 13 of FIG. 4. Then, glass fibers are wound to form wound cylinder member 16, as shown in FIG. 4, while during step S27, the piece is finished by winding moderate strength carbon fiber to form outer cylindrical member 14, as shown in FIG. 4.

During step S28, glass fibers are wound to form the inner cylinder member 12, of FIG. 3A, and in step S29, high-strength carbon fibers are wound over the glass fibers, to thereby form the outermost cylinder 11 of FIG. 3A. The finished hub 15 provided in step S27 and the outer cylindrical portion 9 provided in step S29 are assembled during step S30 by interference fit is used to position the hub within the outer cylindrical portion 9. Finally, during step S31, the multi-piece cylinder 17' is positioned within the fiberglass inner cylindrical member 15 to form the final assembly, i.e., rotor 4.

Alternatively, as shown in FIG. 17, the multi-piece cylinder 17' may advantageously be formed by the method including steps for cooling hexagonal aluminum cylinder 19 in liquid nitrogen, installing a graphite spring 20 and allowing cylinder 19 to thermally expand to its original dimensions (step S40). Pressfitting the aluminum cylinder 19 onto shaft 3 (step S41) and, compressing the graphite spring 20 to accommodate the placement of a plastic member 21 surrounding graphite spring 20 (step S42).

Separately, glass fibers are wound to form inner cylindrical member 15, during step S43. At step S44, moderate strength carbon fibers are wound onto the member 15 to thereby form conical section 13 and during step S45, glass fiber is wound to form member 16. Preferably, the member 15 is finished by winding moderate strength carbon fiber to thereby form member 14, shown in FIG. 4. During step S47, a tool is position over the member 14 to thereby act as a mandrel for the outer cylindrical portion 9. In step S48, the glass fibers are wound to form the inner part of the inner cylinder member 12. During step S49, high-strength carbon fiber is wound onto the glass fibers making up member 12 to form outermost cylinder 11. Finally, during step S50, an interference fit between plastic member 21 and member 15 is used to thereby form the final assembly, i.e., rotor 4.

In an alternative method for manufacturing rotor 4, step S60 is performed to wind moderate-strength carbon fiber to thereby form inner cone 23, as shown in FIG. 15.

Separately, during step S61, moderate-strength carbon fibers are wound to thereby form the conical member 13'. During step S62, glass fibers are wound to form wound cylinder member 16. In order to finish the member 15, moderate-strength carbon fibers are wound to thereby form member 14, as shown in FIG. 4.

Separately, during step S64, glass fibers are wound to form the inner cylinder member 12. Then, during step S65, high-strength carbon fiber is wound over the glass fibers of member 12 to thereby form outermost member 11, illustrated in FIG. 3A.

To finish the flywheel rotor 4, interference fits are established between inner cone 23 within conical member 13', conical member 13' within portion 9, and cone 23 onto shaft 3.

In an alternative method of flywheel rotor construction, the rotor 4 is fabricated during a substantially continuous operation including steps S70–S78, as discussed in greater detail immediately below.

During step S70, a tool is positioned over the shaft 3 and is used as a mandrel to form the inner curvature of the inner cone 23, illustrated in FIG. 15. Next, in step S71, moderate-strength graphite fibers are filament wound onto the shaft 3, to form the inner cone 23. Then, the tool is subsequently positioned over the inner cone 23 and is used as a mandrel in forming the conical member 13' during step S72. Subsequently, moderate-strength carbon fiber is wound onto the previously wound part 23, to thereby form member 13'. During step S74, glass fibers are wound to form member 16, as illustrated in FIG. 4. The assembly 15 is finished by winding moderate-strength carbon to form member 14, as illustrated in FIG. 4, during step S75.

The tool is then positioned over the conical member 13' and is used as a mandrel in forming outer cylindrical portion during step S76. During step S77, glass fibers are filament wound to form the inner cylinder member 12 and, during step S78, high-strength carbon fiber is wound onto the glass fibers thereby forming outermost member 11. It will be appreciated that the steps illustrated in the flow chart of FIG. 19 do not required interference fits between parts fabricated in stages. Thus, attendant alignment and bonding problems advantageously can be eliminated by employing the method illustrated in FIG. 19.

Figure 20:
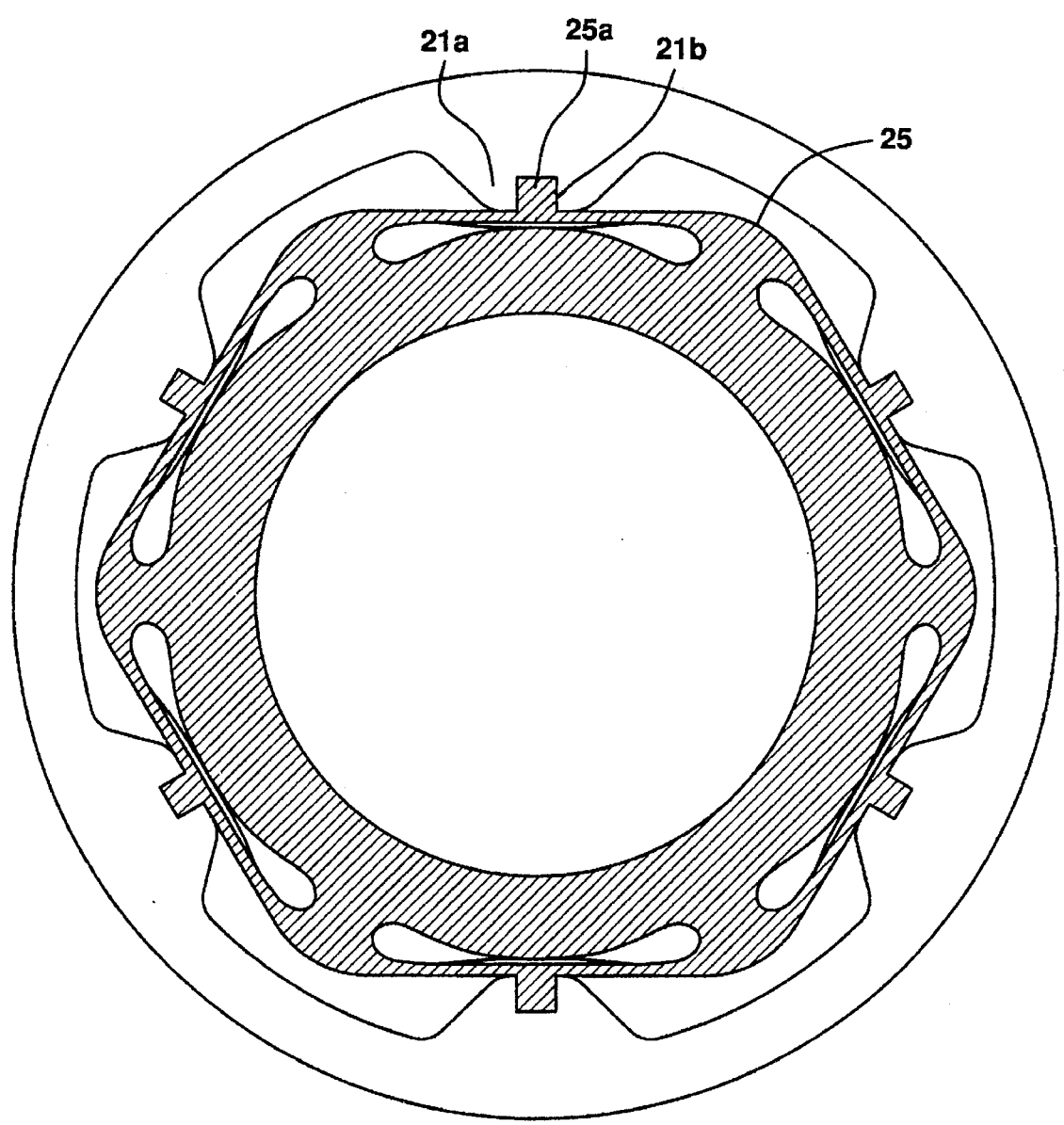
FIG. 20 is a top sectional view of the hub portion shown in FIG. 2 illustrating an alternative construction of the flywheel hub according to the present invention.

Those of ordinary skill in the art will immediately appreciate that the present invention can be practiced by making various modifications without departing from the spirit and scope of the invention. For example, as shown in FIG. 20, cylinder 19 and spring 20 can be incorporated into a single piece 25, which is suitable for machining by, e.g., electric discharge machining. It will be appreciated that the single piece hub of FIG. 20 advantageously can include splines 25a which can be received in corresponding slots 21b in plastic piece 21.

The object of the invention is to provide a high energy storage capability in a light weight, low cost configuration which is capable of very high surge power. The foregoing description of the preferred embodiment is not intended to limit the invention to the precise form disclosed, as many variations are possible in light of the above teaching.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A flywheel rotor for a flywheel energy storage system, comprising:

an outer, primarily cylindrical portion including first fibers having a predetermined first tensile strength for storing the majority of total system energy; and a hub portion including:
a conical member formed from second fibers of a second predetermined second tensile strength; and
a inner cylindrical member operatively connected to a rotatable shaft, said inner cylindrical member comprising:
a hexagonal aluminum cylinder;
a spring surrounding said hexagonal cylinder; and
a plastic annular member operatively connected to said hexagonal aluminum cylinder by said spring,
wherein said conical member operatively connects a first end of said outer cylindrical portion with said inner cylindrical member, and
wherein said first tensile strength is greater than said second tensile strength.

2. The flywheel rotor as claimed in claim 1, wherein said outer cylindrical portion comprises:

an outer cylindrical member including said first fibers; and an inner cylindrical member comprising a material having a relatively high density and a relatively low modulus of elasticity with respect to said first fibers.

3. The flywheel rotor as claimed in claim 2, wherein said first end and a second end of said outer cylindrical portion are tapered.

4. The flywheel rotor as claimed in claim 3, wherein said first and second ends of said outer cylindrical portion are tapered so as to permit reduction of radial stresses at an intersection between said hub portion and said outer cylindrical portion.

5. The flywheel rotor as claimed in claim 4, wherein the radius of said inner cylindrical member is sized so as to permit said conical member to intersect said outer cylindrical portion to thereby form a conical angle.

6. The flywheel rotor as claimed in claim 3, wherein said first and second ends of said outer cylindrical portion are tapered so as to permit reduction of radial stresses at an intersection between said hub portion and said outer cylindrical portion and wherein said inner cylindrical member permits reduction in radial stress in a center region of said outer cylindrical portion.

7. The flywheel rotor as claimed in claim 1, wherein said first fibers and said second fibers are carbon fibers.

8. A flywheel energy storage system, comprising:

a motor-generator; and a rotor, said rotor comprising:
an outer, primarily cylindrical portion including first fibers having a predetermined first tensile strength for storing the majority of total system energy; and
a hub portion including:
a conical member formed from second fibers of a second predetermined second tensile strength; and
an inner cylindrical member operatively connected to a rotatable shaft, said inner cylinder member comprising:
a hexagonal cylinder;
a spring surrounding said hexagonal cylinder; and
a plastic annular member, wherein said hexagonal cylinder and said plastic annular member are operatively connected by said spring,
wherein said conical member operatively connects a first end of said outer cylindrical portion with said inner cylindrical member,
wherein said first tensile strength is greater than said second tensile strength, and
wherein a portion of said motor-generator is disposed within a cavity defined by said conical member.

9. The flywheel energy storage system as claimed in claim 8, wherein said first fibers and said second fibers are carbon fibers.

10. The flywheel energy storage system as claimed in claim 8, wherein said hub portion is operatively connected to a first end of said outer cylindrical portion and wherein said first end is conically tapered in an axial direction so as to permit a reduction in radial stress in a region where said hub portion is connected to said outer cylindrical portion.

* * * * *